United States Patent [19]
Suzuki et al.

[11] Patent Number: 5,850,293
[45] Date of Patent: Dec. 15, 1998

[54] IMAGE PROCESSOR HAVING A DISCRIMINATOR FOR DISCRIMINATING AN INSIDE AREA AND AN OUTSIDE AREA

[75] Inventors: Hiroyuki Suzuki; Yoshihiko Hirota, both of Toyokawa, Japan

[73] Assignee: Minolta Co., Ltd., Osaka, Japan

[21] Appl. No.: 747,827

[22] Filed: Nov. 13, 1996

[30] Foreign Application Priority Data

Nov. 13, 1995 [JP] Japan .................................. 7-294372

[51] Int. Cl.⁶ .................. G03F 3/08; G06K 9/40
[52] U.S. Cl. .................. 358/298; 358/529; 382/266
[58] Field of Search ................... 358/296, 298, 358/462, 464, 505, 518–523, 529, 530, 532, 534, 535, 538; 382/162, 164, 165, 167, 176, 263, 266, 254, 260

[56] References Cited

U.S. PATENT DOCUMENTS

| | | | |
|---|---|---|---|
| 5,032,903 | 7/1991 | Suzuki et al. | 358/530 |
| 5,047,844 | 9/1991 | Ikeda et al. | 358/521 |
| 5,134,667 | 7/1992 | Suzuki | 382/266 X |
| 5,251,023 | 10/1993 | Arimoto et al. | 358/529 |
| 5,392,365 | 2/1995 | Steinkirchner | 358/538 X |
| 5,398,124 | 3/1995 | Hirota | 358/530 |
| 5,408,343 | 4/1995 | Sugiura et al. | 358/520 |

*Primary Examiner*—Peter S. Wong
*Assistant Examiner*—Gregory J. Toatley, Jr.
*Attorney, Agent, or Firm*—Burns, Doane, Swecker & Mathis, LLP

[57] ABSTRACT

A digital image of a document having chromatic and achromatic colors is read, and an edge of a black character is discriminated. Further, an outside area and an inside area of the edge are detected. Edge emphasis is performed on an inside area of the edge for data of achromatic colors. On the other hand, data of chromatic colors in an inside area of the edge is substituted with a minimum data of the pixel under interest and pixels surrounding the pixel. Data of chromatic colors and of achromatic colors in the outside area is substituted with a minimum data of the pixel under interest and pixels surrounding the pixel.

17 Claims, 25 Drawing Sheets

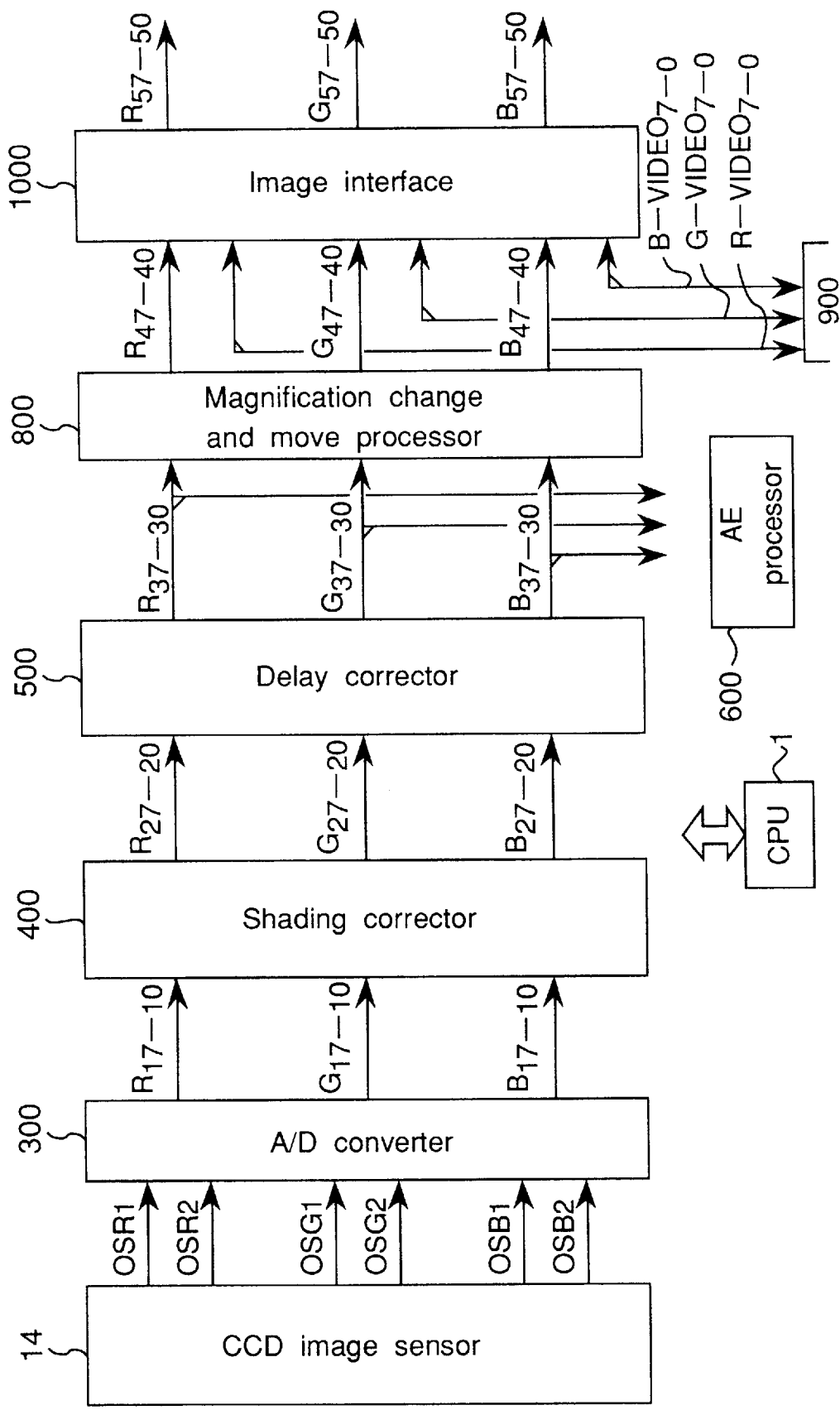

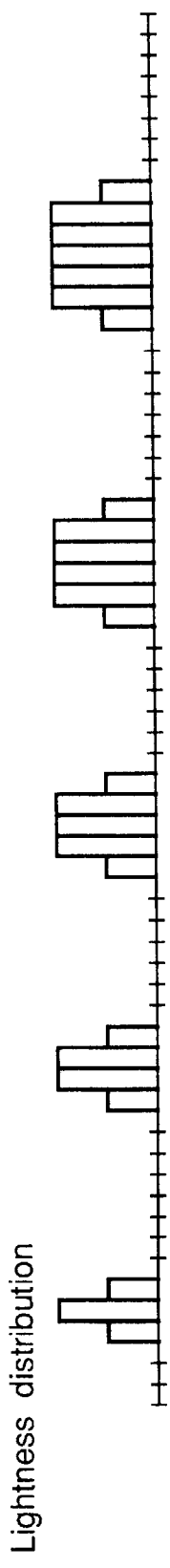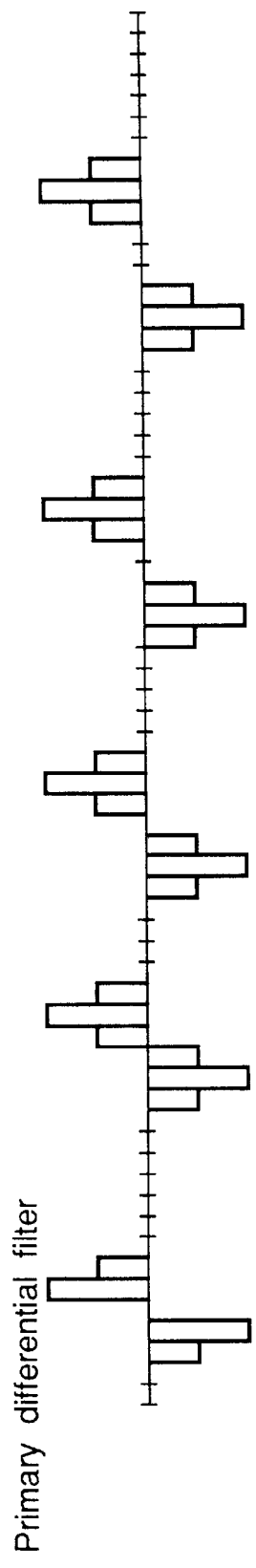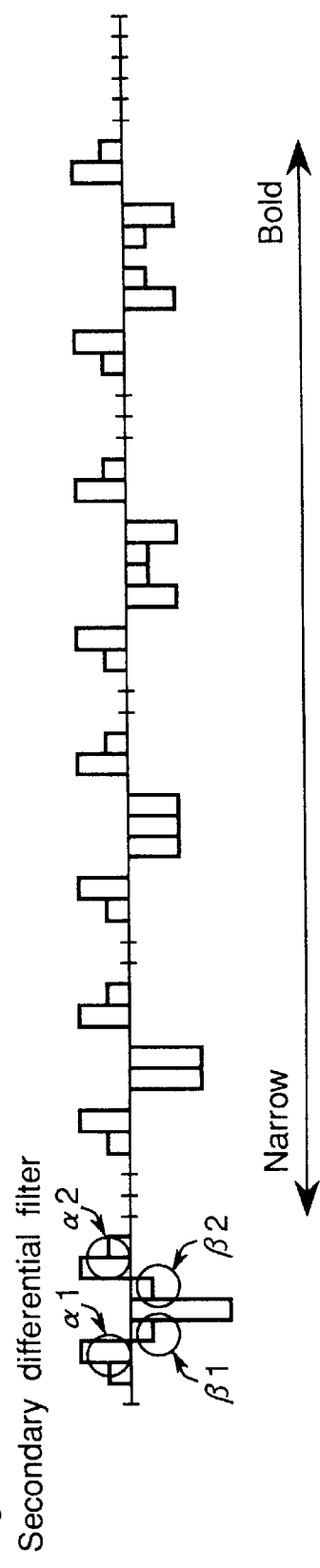
Fig. 6A Lightness distribution
Fig. 6B Primary differential filter
Fig. 6C Secondary differential filter

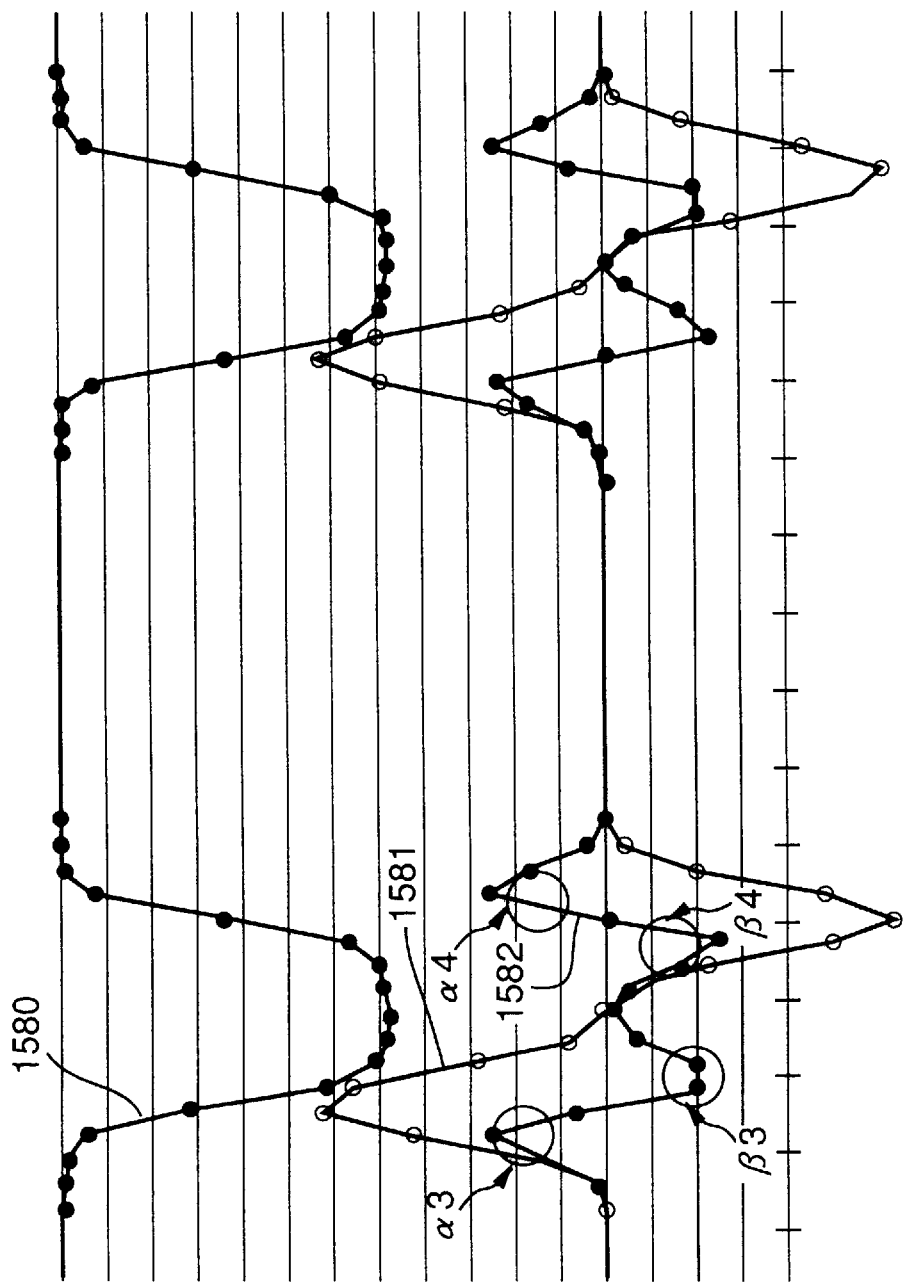

Fig.9

| 1/8 | 0   | 0 | 0    | −1/8 |
|-----|-----|---|------|------|
| 1/8 | 1/8 | 0 | −1/8 | −1/8 |
| 1/8 | 1/8 | 0 | −1/8 | −1/8 |
| 1/8 | 1/8 | 0 | −1/8 | −1/8 |
| 1/8 | 0   | 0 | 0    | −1/8 |

Fig.10

| −1/8 | −1/8 | −1/8 | −1/8 | −1/8 |
|------|------|------|------|------|
| 0    | −1/8 | −1/8 | −1/8 | 0    |
| 0    | 0    | 0    | 0    | 0    |
| 0    | 1/8  | 1/8  | 1/8  | 0    |
| 1/8  | 1/8  | 1/8  | 1/8  | 1/8  |

| 0 | 0 | 1/4 | 0 | 0 |
|---|---|---|---|---|
| 0 | 0 | 0 | 0 | 0 |
| 1/4 | 0 | −1 | 0 | 1/4 |
| 0 | 0 | 0 | 0 | 0 |
| 0 | 0 | 1/4 | 0 | 0 |

| $a_{11}$ |  | $a_{13}$ |  | $a_{15}$ |
|---|---|---|---|---|
|  | $a_{22}$ | $a_{23}$ | $a_{24}$ |  |
| $a_{31}$ | $a_{32}$ | X | $a_{34}$ | $a_{35}$ |
|  | $a_{42}$ | $a_{43}$ | $a_{44}$ |  |
| $a_{51}$ |  | $a_{53}$ |  | $a_{55}$ |

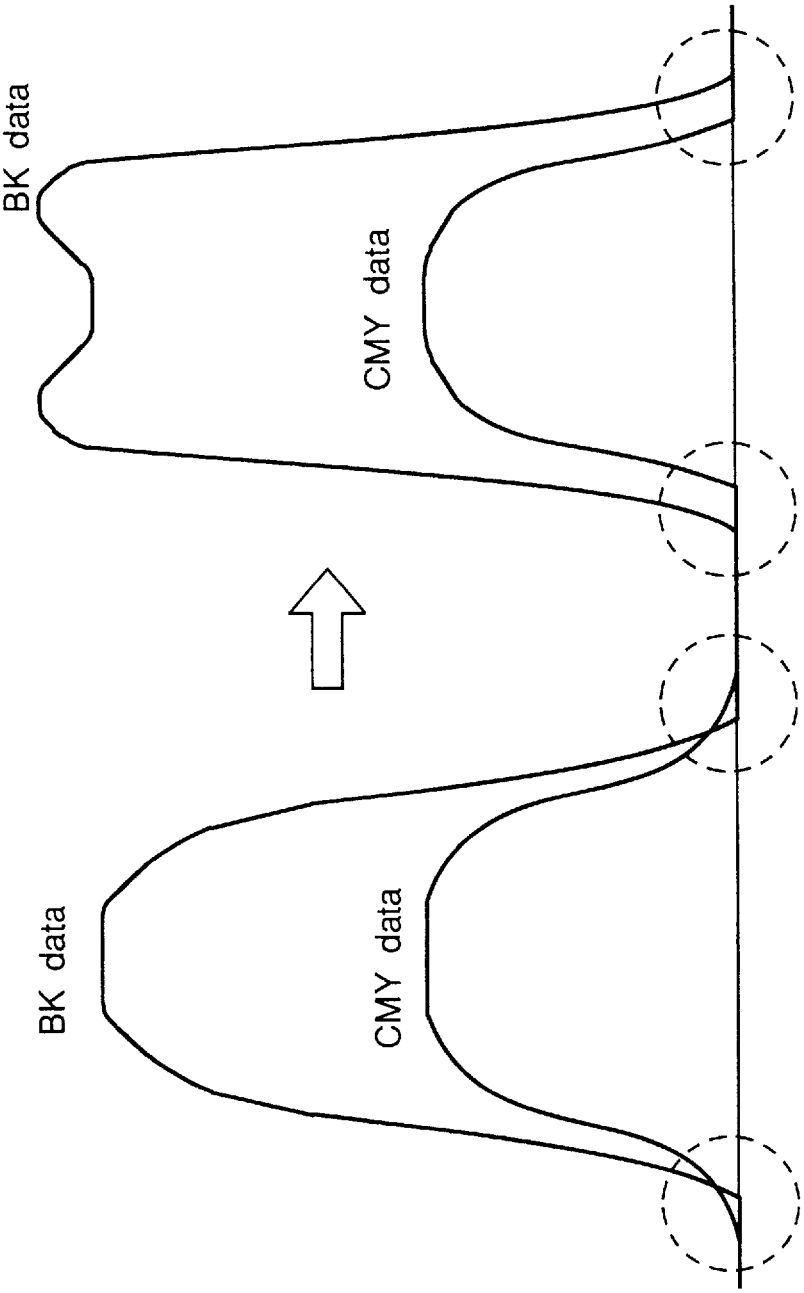

Fig.23

| 0 | 0 | −1/4 | 0 | 0 |
|---|---|---|---|---|
| 0 | 0 | 0 | 0 | 0 |
| −1/4 | 0 | 1 | 0 | −1/4 |
| 0 | 0 | 0 | 0 | 0 |
| 0 | 0 | −1/4 | 0 | 0 |

*Fig.25*

| 1/64 | 1/32 | 1/32 | 1/32 | 1/64 |
|------|------|------|------|------|
| 1/32 | 1/16 | 1/16 | 1/16 | 1/32 |
| 1/32 | 1/16 | 1/16 | 1/16 | 1/32 |
| 1/32 | 1/16 | 1/16 | 1/16 | 1/32 |
| 1/64 | 1/32 | 1/32 | 1/32 | 1/64 |

*Fig.26*

| 0 | 0    | 0   | 0    | 0 |
|---|------|-----|------|---|
| 0 | 1/16 | 3/8 | 1/16 | 0 |
| 0 | 1/8  | 1/4 | 1/8  | 0 |
| 0 | 1/16 | 1/8 | 1/16 | 0 |
| 0 | 0    | 0   | 0    | 0 |

*Fig.27*

| 0 | 0    | 0    | 0    | 0 |
|---|------|------|------|---|
| 0 | 1/64 | 3/32 | 1/64 | 0 |
| 0 | 3/32 | 9/16 | 3/32 | 0 |
| 0 | 1/64 | 3/32 | 1/64 | 0 |
| 0 | 0    | 0    | 0    | 0 |

Fig.28

| $a_{11}$ | $a_{12}$ | $a_{13}$ | $a_{14}$ | $a_{15}$ |
|---|---|---|---|---|
| $a_{21}$ | $a_{22}$ | $a_{23}$ | $a_{24}$ | $a_{25}$ |
| $a_{31}$ | $a_{32}$ | $a_{33}$ | $a_{35}$ | $a_{35}$ |
| $a_{41}$ | $a_{42}$ | $a_{43}$ | $a_{44}$ | $a_{45}$ |
| $a_{51}$ | $a_{52}$ | $a_{53}$ | $a_{55}$ | $a_{55}$ |

Fig.29

| $a_{11}$ | $a_{12}$ | $a_{13}$ |
|---|---|---|
| $a_{21}$ | $a_{22}$ | $a_{23}$ |
| $a_{31}$ | $a_{32}$ | $a_{33}$ |

IMAGE PROCESSOR HAVING A DISCRIMINATOR FOR DISCRIMINATING AN INSIDE AREA AND AN OUTSIDE AREA

BACKGROUND OF THE INVENTION

1. Field of the Invention

The present invention relates to an image forming apparatus such as a digital color copying machine.

2. Description of the Prior Art

In a digital color copying machine, a document is read to get digital data of red, green and blue thereof, and the digital data are converted to image data of cyan, magenta, yellow and black, which are reproduced on a sheet of paper with toners having the four colors. The image data are subjected to various processing. For example, MTF correction is performed before printing. For a document image comprising black characters, it is desirable to emphasize edges of black characters. Then, for example, black characters are detected in a document image, and the image data for the black characters are subjected to edge emphasis and are reproduced with black toners. Thus, the black characters are reproduced with black toners, and the image quality is improved.

As to the black characters in a white background, image data of cyan, magenta and yellow are suppressed at the edges according to lightness of the image data. However, if black characters are described in a colored background, an amount of the image data of cyan, magenta and yellow to be decreased becomes large, so that areas adjacent to the black characters become white though they have a color of the colored background. This deteriorates image quality in a reproduced image. Further, it is also observed that the outside of an edge becomes thick or irregular after edge emphasis.

SUMMARY OF THE INVENTION

An object of the present invention is to provide an image processor which performs edge emphasis without deteriorating image quality.

In an aspect of the invention, an image processor reads image data of a document, and the image data are converted to color data of yellow, magenta, cyan and black. A detector detects an edge part consisting of pixels of black in the image data, and a discriminator discriminates an inside area and an outside area of the edge part. Then, the image data are processed in the inside area and in the outside area differently from each other. Edge emphasis is performed in one of the inside area and the outside area, say in the inside area, for example, by adding a predetermined value to the data. On the other hand, data for a pixel other than black are decreased in the inside and outside areas of the edge part to a minimum of the data of the pixel under interest and predetermined pixels surrounding the pixel. Then, the data subjected to edge emphasis are used to print an image of the document.

An advantage of the invention is that edge emphasis is performed appropriately without deteriorating image quality.

BRIEF DESCRIPTION OF THE DRAWINGS

These and other objects and features of the present invention will become clear from the following description taken in conjunction with the preferred embodiments thereof with reference to the accompanying drawings, and in which:

FIGS. 2A and 2B are block diagrams of a read signal processor;

FIG. 6A is a graph of lightness distribution of five lines with different size from each other, FIG. 6B is a graph of primary differentials for the five lines, and FIG. 6C is a graph of secondary differentials for the five lines;

FIG. 7 is a graph of primary and secondary differentials for a line having a width of 500 $\mu$m;

FIG. 9 is a diagram of a primary differential filter along the main scan direction;

FIG. 10 is a diagram of another primary differential filter along the subscan direction;

FIGS. 20A and 20B are diagrams for explaining a slight extension of chroma data outside a character and deletion of such extension;

FIG. 23 is a diagram of a Laplacian filter;

FIG. 25 is a diagram of a smoothing filter for smoothing input data of 400 dpi to 300 dpi;

FIG. 26 is a diagram of another smoothing filter for smoothing input data of 400 dpi to 200 dpi;

FIG. 27 is a diagram of a further smoothing filter for smoothing input data of 400 dpi to 100 dpi;

FIG. 28 is a diagram of a filter of 5*5 matrix for detecting a minimum; and

FIG. 29 is a diagram of a filter of 3*3 matrix for detecting a minimum.

DETAILED DESCRIPTION OF THE PREFERRED EMBODIMENTS

Figure 1:
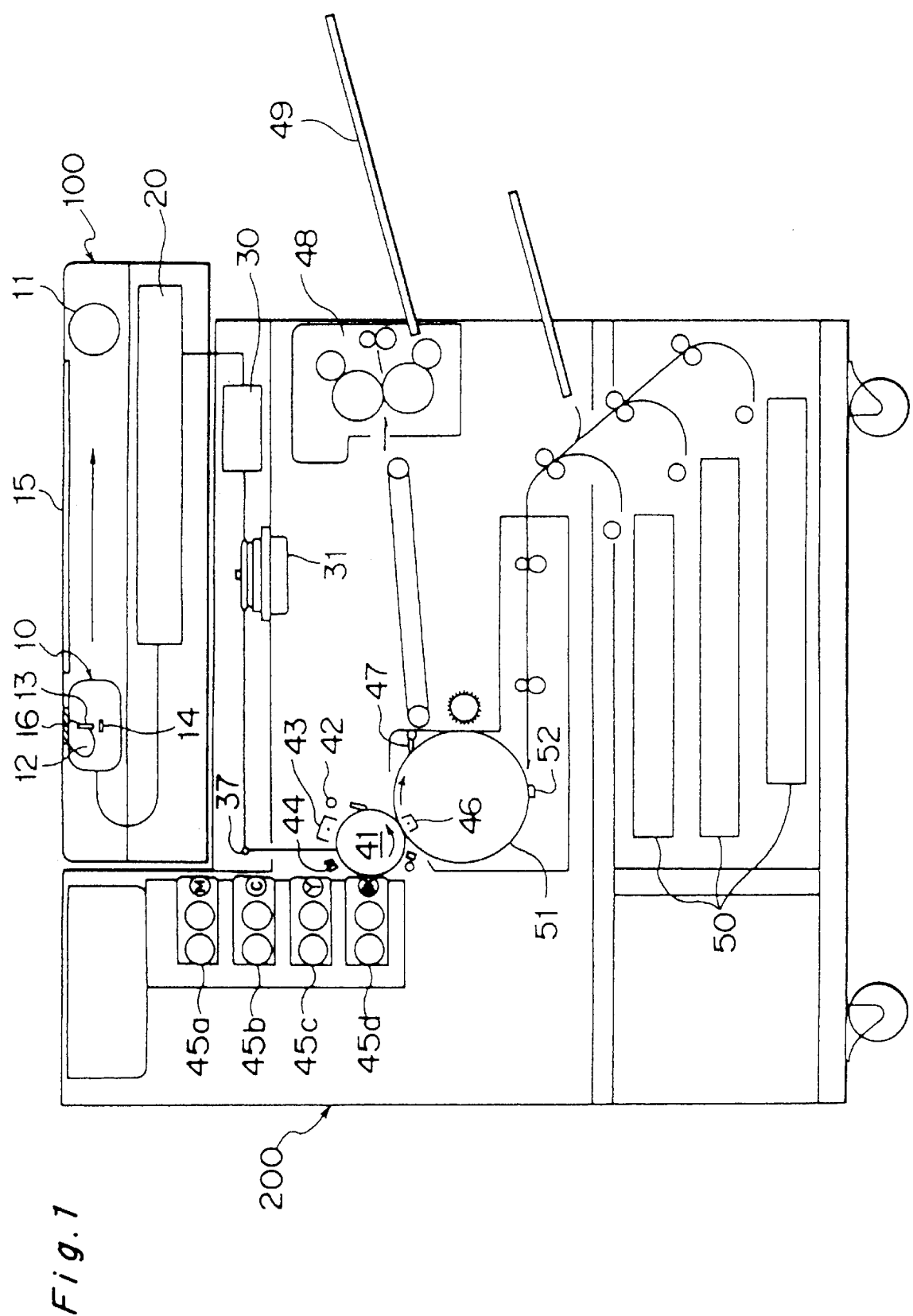
FIG. 1 is a schematic sectional view of a digital color copying machine of an embodiment of the invention.

Referring now to the drawings, wherein like reference characters designate like or corresponding parts throughout the drawings, an embodiment of the invention is described.

FIG. 1 shows a digital color copying machine comprising an image reader 100 reading a document image and an image forming section 200 reproducing an image read by the image reader 100. In the image reader 100, a scanner 10 comprises a lamp 12 exposing a document put on a platen 15, a rod lens array 13 condensing a light reflected from the document, and a CCD color image sensor 14 converting the condensed light to electric signals. The image sensor 14 has CCD elements for reading digital image data of components of red (R), green (G) and blue (B). When a document image is read, the scanner 10 is driven by a motor 11 to be moved along a subscan direction (shown with an arrow). The scanner reads a white plate 16 for shading correction first and scans the document. An image of the document exposed with the lamp 12 is converted to multi-level electric signals of the three colors by the image sensor 14. After shading correction, a signal processor 20 converts the signals to 8-bit gradation data of yellow (Y), magenta (M), cyan (C) and black (BK). Yellow, magenta and cyan are chromatic colors, while black is an achromatic color. The data are further subjected to MTF correction, gamma correction and the like. Then, they are stored in the buffer memory 30.

Next, in the image forming section 200, a printer head 31 converts the data to an analog driving signal, and a laser diode in the printer head 31 emits a light modulated according the signal. The laser beam emitted by the laser diode is reflected by a mirror 37 to expose a rotating photoconductor drum 41. The drum 41 has been erased before exposure for each copy operation and has been charged uniformly by a sensitizing charger 43. When the drum 41 is exposed in such a state, an electrostatic latent image of a document is formed on the photoconductor drum 41. One of four development unit 45a–45d of toners of cyan, magenta, yellow and black is selected to develop the latent image. A toner image developed is transferred by a transfer charger 46 onto a sheet of paper supplied from a cassette 50 set on a transfer drum 51.

The above-mentioned printing process are repeated for four colors of yellow, magenta, cyan and black. The scanner 10 repeats the scan in synchronization with the transfer drum 51. Then, the sheet of paper is separated by a separation claw 47 from the transfer drum 51, passes through a fixing unit 48 for fixing the toner image and is discharged onto a tray 49.

Next, processing in the read signal processor 20 are explained. First, they are explained generally with reference to FIGS. 2A and 2B. Then, detection of black characters and edge emphasis relevant to the embodiment are in detail.

Figure 2B:
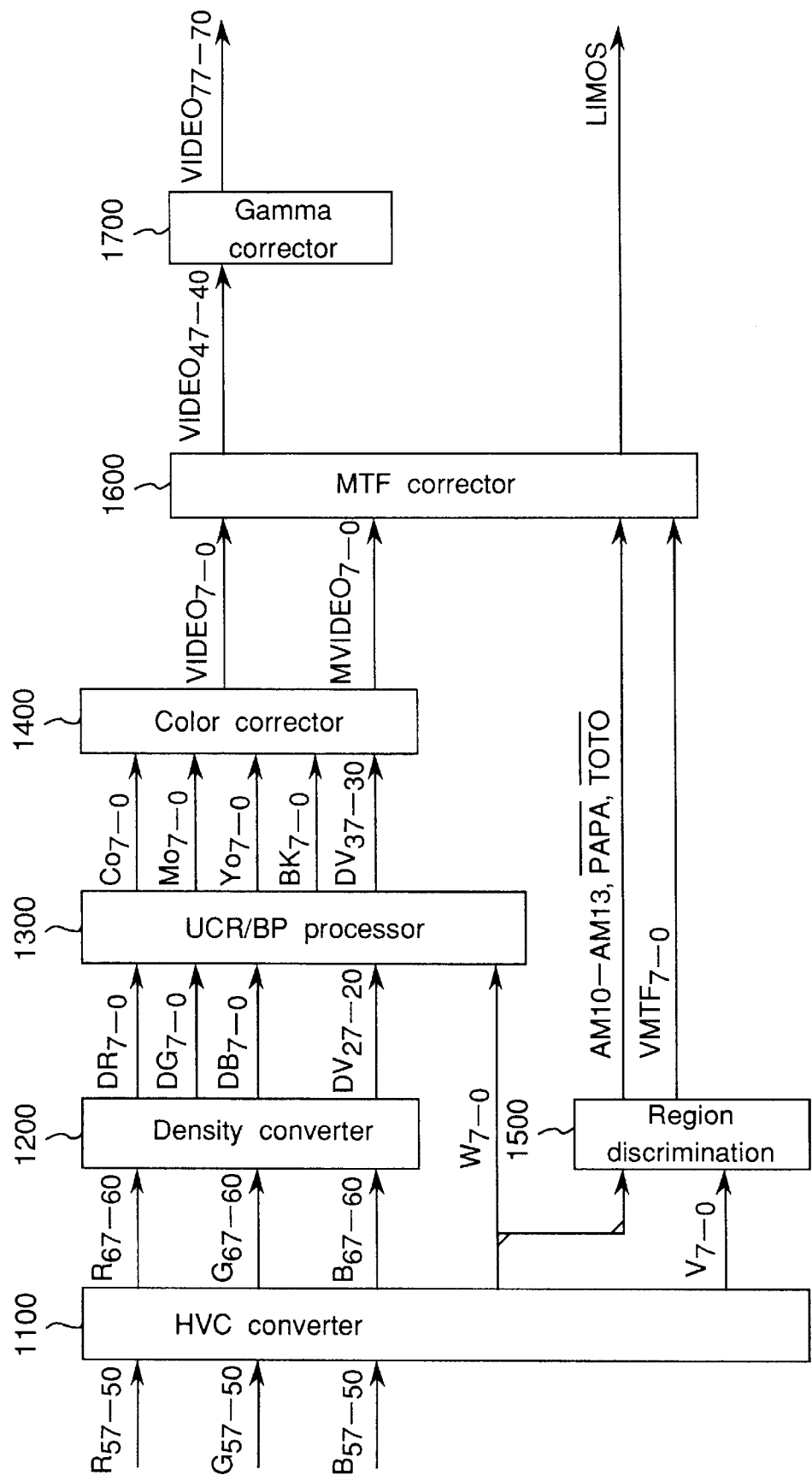

FIGS. 2A and 2B show blocks in the read signal processor 20. Analog image data of red, green and blue are sent to an analog-to-digital (A/D) converter 300. The A/D converter 300 converts the input data to 8-bit digital image data $R_{17-10}$, $G_{17-10}$, $B_{17-10}$ of the three colors and sends it to the shading correction section 400.

The shading correction section 400 corrects scattering of read data due to scattering of optical intensity of the lamp 12 and the like to output components $R_{27-20}$, $G_{27-20}$ and $B_{27-20}$.

The image sensor 14 has three lines of CCD elements spaced by a predetermined distance for reading image data of red, green and blue. Each component of image data of the three colors may be called simply as R data, G data and B data. A correction unit 500 stores the R data and G data temporarily to delay by predetermined times with respect to the B data in correspondence to the distances between the three lines. The corrected data $R_{37-30}$, $G_{37-30}$ and $B_{37-30}$ are sent to an AE processor 600 and to a magnification change and move processor 800.

The AE processor 600 detects a size of the document and performs automatic color selection and automatic exposure. In the detection of document size, a range of the existence of the document on the platen 15 is detected along a main scan direction in the unit of line. In the automatic color selection, it is decided based on a ratio of monochromatic pixels in a document whether the document is a full color document or a monochromatic one. In the automatic exposure, the underground of a document is determined so that the brightest color in the document has gradation level 255 for white. However, if automatic exposure is performed on a full color document, it seems that the reproduced image is faded as a whole. Then, in this embodiment, the ground level is determined according to the automatic color selection, while automatic exposure is forbidden for a full color image.

The magnification change and move processor 800 performs deletion of data in a region not needed to be reproduced, interpolation of data on reduction and enlargement and the like on data $R_{37-30}$, $G_{37-30}$ and $B_{37-30}$. The above-mentioned region includes a region wherein no document exists on the platen 15 and a region resulting from reduction of document image, and it is deleted according to the document size detected in the AE processor 600.

An image interface 1000 selects either R, G and B data ($R_{47-40}$, $G_{47-40}$ and $B_{47-40}$) received from the magnification change and move processor 800, or R-VIDEO$_{7-0}$, G-VIDEO$_{7-0}$ and B-VIDEO$_{7-0}$, received from an external apparatus 900. It may synthesize them. Further it generates timing signals for sending image data to an RGB interface or a printer interface.

The HVC converter 1100 generates lightness (value) signal $V_{7-0}$, color difference signals $WR_{7-0}$ and $WB_{7-0}$ based on the R, G, B data ($R_{57-50}$, $G_{57-50}$ and $B_{57-50}$) obtained by reading color patches actually with the image sensor 14 and on the R, G, B data on the patches stored in a ROM. Further, it generates chroma signal $W_{7-0}$ and hue signal $H_{7-0}$. Thus, scatterings of read characteristics of the image sensor can be corrected.

A density converter 1200 (FIG. 3) converts R, G, B data ($R_{67-60}$, $G_{67-60}$ and $B_{67-60}$) proportional to a quantity of light reflected from a document to density data $DR_{27-20}$, $DG_{27-20}$ and $DB_{27-20}$.

A UCR/BP processor 1300 obtains a minimum among the density data $DR_{27-20}$, $DG_{27-20}$ and $DB_{27-20}$ to set a part of the minimum as a black data $BK_{7-0}$ for painting black toners. On the other hand, quantities of toners of cyan, magenta and yellow are removed in correspondence to the black data (undercolor) to supply data, $Co_{7-0}$, $Mo_{7-0}$ and $Yo_{7-0}$. Further, the as-received lightness data $DV_{27-20}$ are output as lightness data $DV_{37-30}$.

A color corrector 1400 performs masking operation for adjusting color reproduction in correspondence to spectral characteristics of color filters of the image sensor 14 and the toners of cyan, magenta and yellow, and sends density data VIDEO$_{7-0}$ and lightness data MVIDEO$_{7-0}$ to the MTF corrector 1600.

A region discriminator 1500 (FIGS. 5A and 5B) discriminates black character areas and dot image areas in a document image. (In a dot image area, an image is composed of dots.) The discrimination of black characters comprises detection of a character (edges), detection of black, and detection of a region which is liable to be detected as black. A character (edges) is detected with differential filters. Black is detected based on chroma data. In this embodiment, erroneous decision can be prevented by smoothing the chroma data when the R, G and B data shifts slightly, for example, due to vibrations of the image sensor 14 on reading image data. Further, in order to prevent an erroneous decision as a black character on a character having a low lightness and a low chroma, a color background is discriminated. Even when it is decided as a black character, the decision is invalidated for a region decided to be a color background. Thus, a black character can be decided correctly.

An MTF corrector 1600 performs edge emphasis and smoothing most suitable for the density data VIDEO$_{7-0}$ based on the kind of pixels and printing situation. If copying is operated in a full color standard mode, edges are not emphasized on data of cyan, magenta and yellow at both inside and outside of black edges, and each data is decreased. Further, edges are not emphasized at the outside of the edges when BK data is printed. Thus, an undesired extended line and the like or whitening around characters can be prevented (refer to FIG. 21A). Further, a prescribed value is added to pixel data at edges to correct amounts of excess or deficient toners. The MTF corrector 1600 will be explained later in detail.

Further, a duty ratio of laser emission is changed according to the kind of pixel recognized by the region discriminator 1500. The duty ratio is defined as a ratio of laser emission time in a pixel clock cycle. In case of a pixel in a dot image, the duty ratio is set to be 100% in order to prevent a Moire pattern. Otherwise the duty ratio is set to be say 80% in order to reduce noises between lines. The duty ratio is sent as LIMOS signal.

A gamma corrector 1700 performs gamma correction on the image data VIDEO$_{47-40}$ to output image data VIDEO$_{72-70}$.

Figure 3:
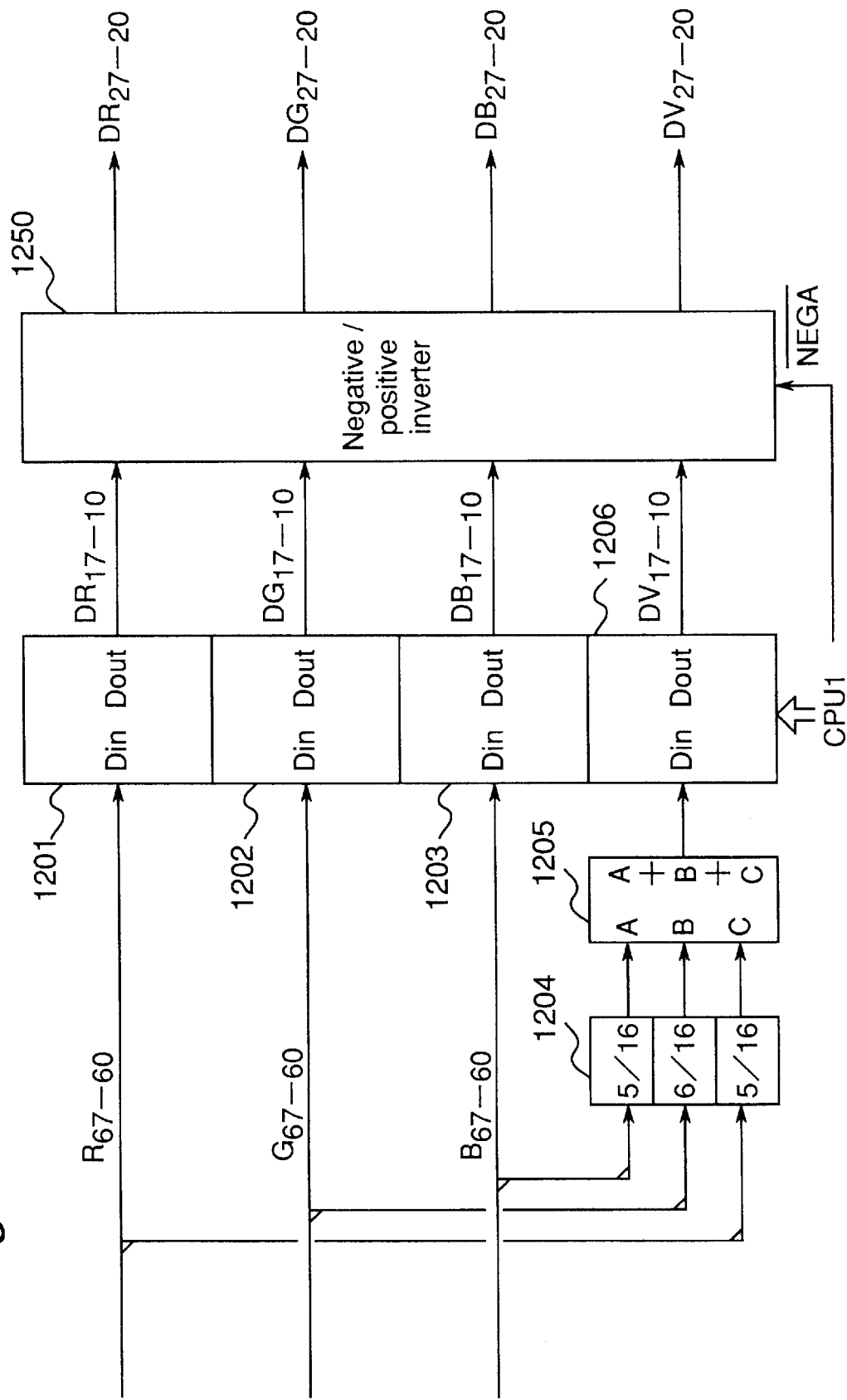
FIG. 3 is a block diagram of a density converter.
Figure 4:
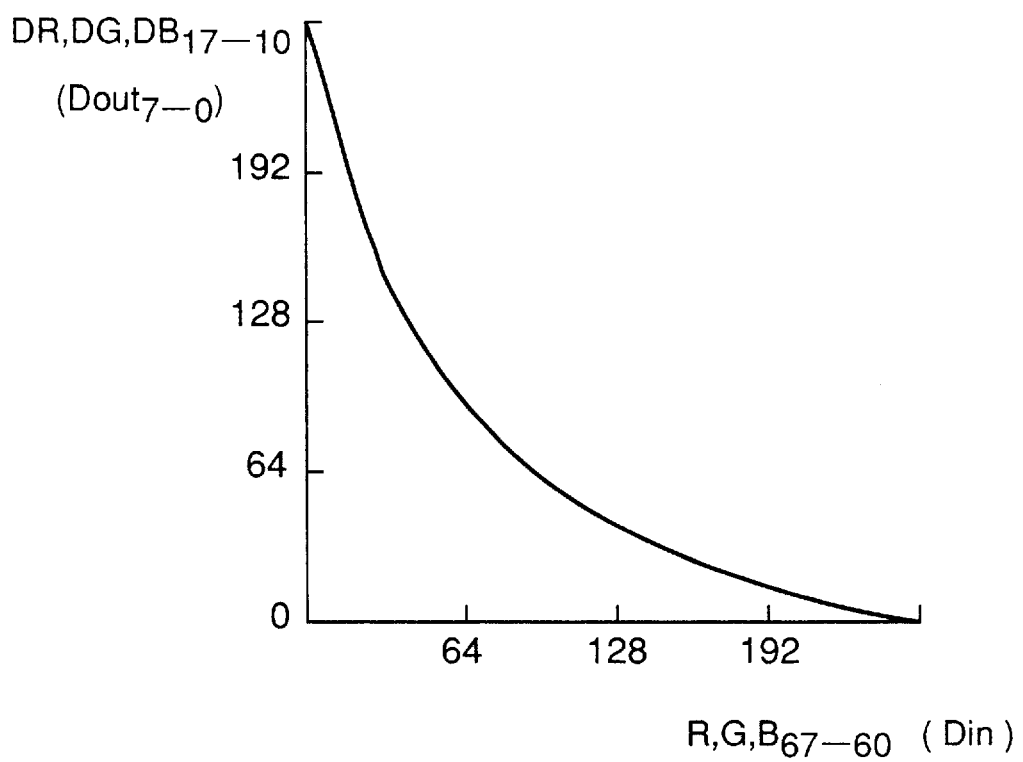
FIG. 4 is a graph of LOG table.

As shown in FIG. 3, the density converter 1200 has four logarithm tables 1201, 1202, 1203 and 1206 for converting R, G, B data (R$_{67-60}$, G$_{67-60}$ and B$_{67-60}$) proportional to a quantity of the light reflected from the document and an average thereof D$_{in}$ to density data DR$_{17-10}$, DG$_{17-10}$, DB$_{17-10}$ and DV$_{17-10}$. The R, G and B data are averaged with weights of 5:6:5 by a weight section 1204. The weighted data are added in an adder 1205, and the sum SUM is sent to the table 1206. FIG. 4 shows the conversion relations of the tables 1201–1203, 1206.

$$DR = -(255/DMAX)*LOG(R/255),$$
$$DG = -(255/DMAX)*LOG(R/255), \qquad (1)$$
$$DB = -(255/DMAX)*LOG(R/255),$$

and $$DV = -(255/DMAX)*LOG(R/255),$$

wherein DMAX is maximum reflection light data. Further, a negative/positive invertor 1250 inverts the data DR$_{17-10}$, DG$_{17-10}$ and DB$_{17-10}$ to DR$_{27-20}$, DG$_{27-20}$ and DB$_{27-20}$ if $\overline{\text{NEGA}}$ signal is received, otherwise it passes the as-received data. The $\overline{\text{NEGA}}$ signal is set by pressing a key provided in an operational panel (not shown) of the copying machine.

Figure 5A:
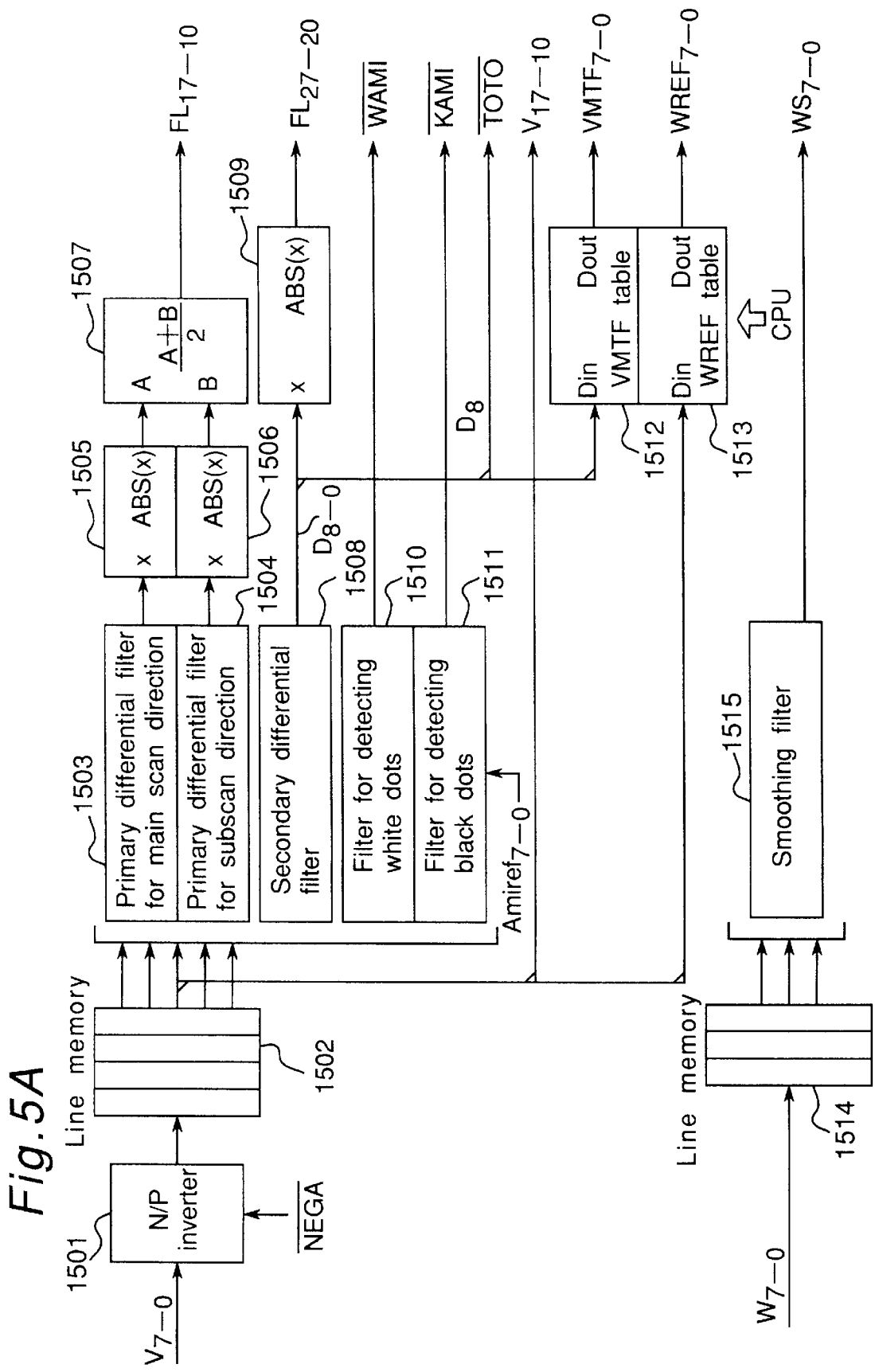
FIGS. 5A and 5B are block diagrams of a region discriminator.
Figure 5B:
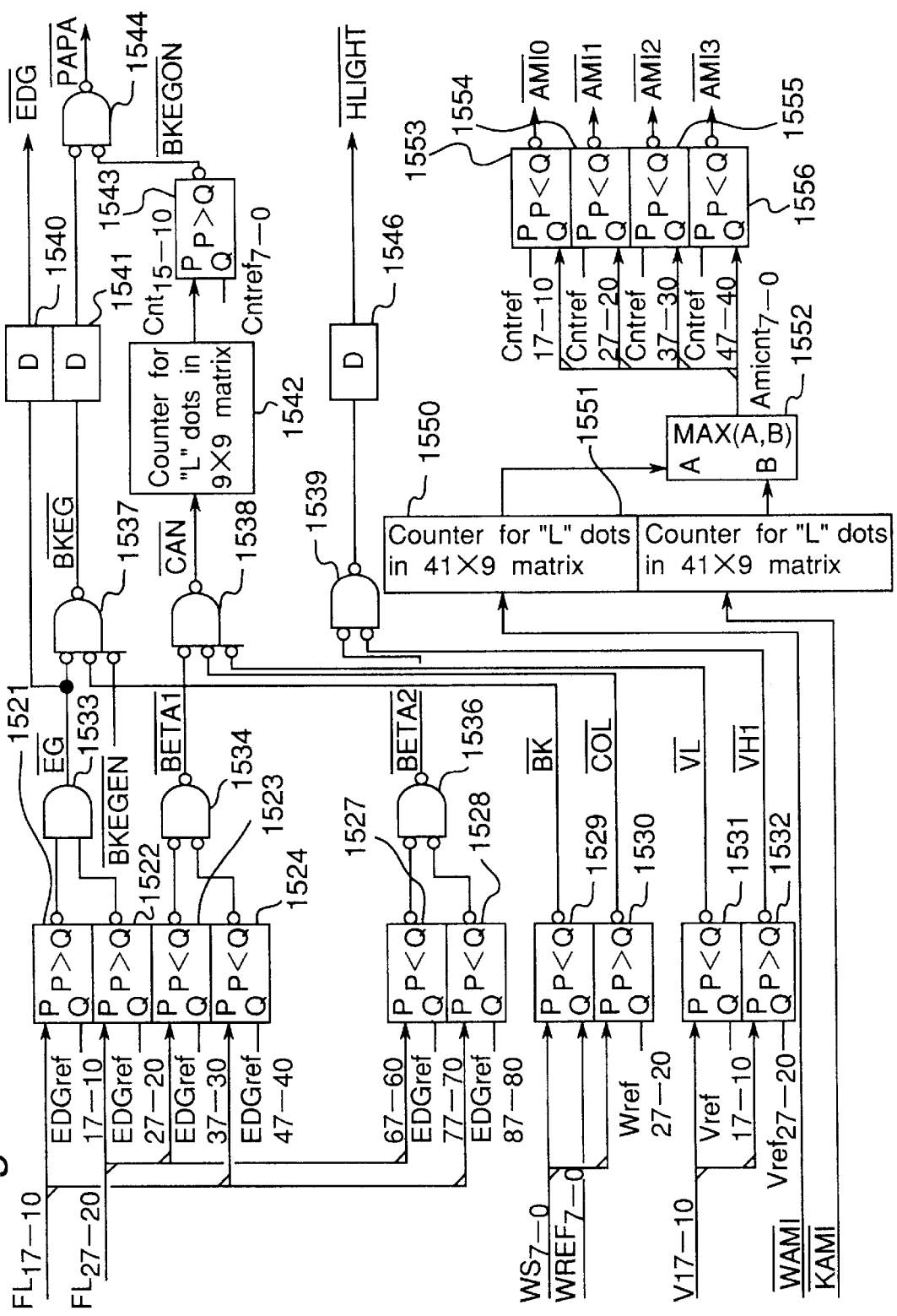

FIGS. 5A and 5B are block diagrams of the region discriminator 1500 which discriminates black character areas and dot image areas in a document image. The discrimination of black characters comprises five steps of (a) detection of a character (edge), (b) detection of black pixel, (c) detection of a region which is liable to be detected as black, (d) discrimination of the inside and outside of an edge, and (f) generation of black edge reproduction signal which is performed by the MTF corrector 1600. These steps are explained below.

First, detection of a character (edge) is explained in detail. A character has two components of edge parts and uniform parts. A uniform part is surrounded by two edge parts. An outside region of an edge part represents a region at the outside of the edge part with respect to a uniform part adjacent to the edge part. That is, the outside of the edge part is not included in the uniform part. On the other hand, an inside region of the edge part represents a region at the inside of the edge part with respect to the uniform part. That is, the outside region of the edge part is included in the uniform part. If a character is thin, it has only edge portions. Then, a character is discriminated by detecting edge parts.

In the region discriminator 1500 shown in FIG. 5A, the lightness signal V$_{7-0}$ generated by the HVC converter 1100 is received through a negative/positive invertor 1501 and written to a line memory 1502 of four lines. If $\overline{\text{NEGA}}$ signal set by an operator with the operational panel is "L" level, the invertor 1501 inverts the input data.

The data in the line memory 1502 is sent to primary differential filters 1503 and 1504 shown in FIGS. 9 and 10 for the main scan direction and for the subscan direction, each having a 5*5 matrix, and to a secondary differential filter 1508. In this embodiment, edge parts are detected with two kinds of differential filters because each has a feature explained below.

FIG. 6A shows lightness distribution of five character lines with different width from each other. The width of the character lines becomes larger towards the right side in FIG. 6A. Further, FIG. 6B shows primary differentials for the five character lines, and FIG. 6C shows secondary differentials for the five character lines. The primary differential filter outputs a detection value higher than the secondary one at an edge of a thick character line (of a width of four pixels or larger). That is, the primary differential filter is suitable for detecting a thick edge of a character line having a width of four pixels or larger, while the secondary differential filter is suitable for detecting a thin edge of a character line having a width less than four pixels. Further, it is found that the secondary differential filter generates positive values at the outside of an edge part (refer to α1 and α2 in FIG. 6C) and negative values at the inside of the edge part (refer to β1 and β2 in FIG. 6C).

Figure 8:
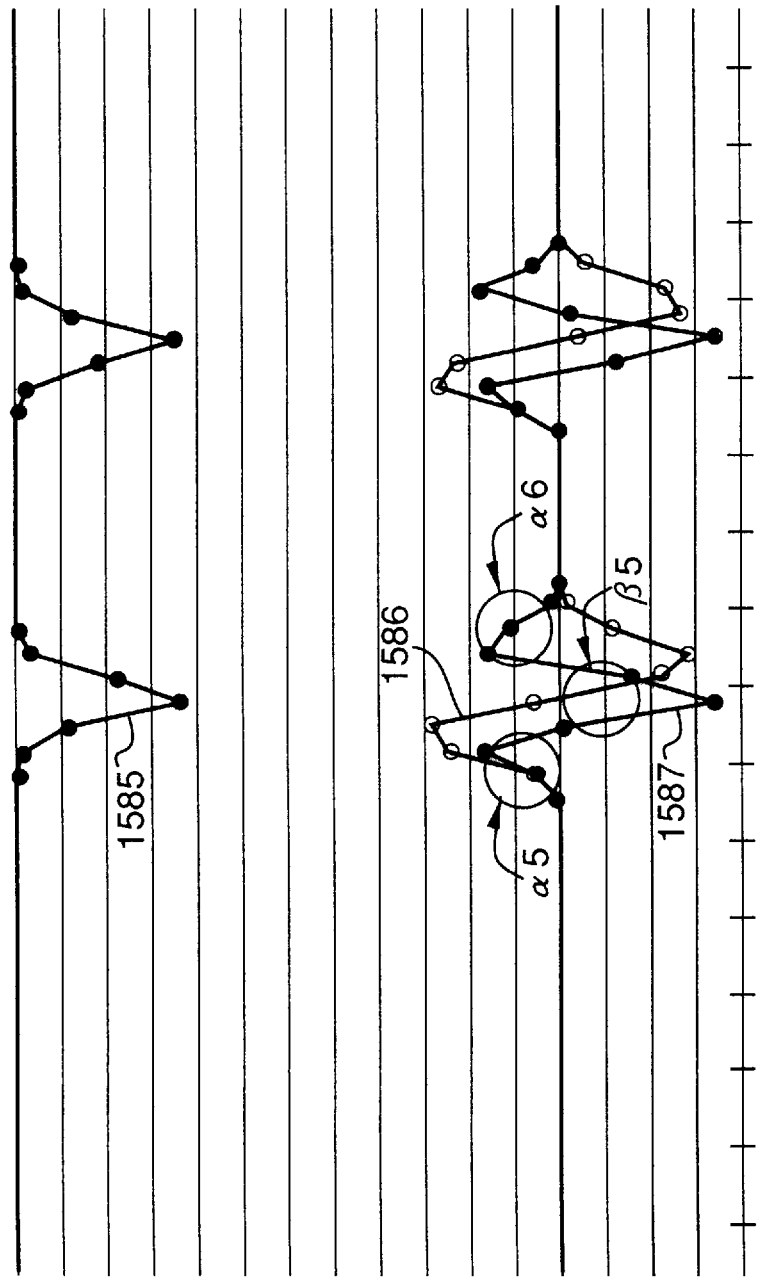
FIG. 8 is a graph of primary and secondary differentials for a line having a width of 70 $\mu$m.

FIGS. 7 and 8 are graphs of examples of primary and secondary differentials for a first character line of width of 500 μm and for a second character line of width of 70 μm. In FIG. 7, a line 1580 represents data on the first line having a width of 500 μm, while lines 1581 and 1582 represent the first and secondary differential thereof, respectively. On the other hand, in FIG. 8, a line 1585 represents data on the second line having a width of 70 μm, while line 1586 and 1587 represent the primary and secondary differentials thereof. The secondary differentials have positive values at the outside of edge parts, as shown at α$_3$ and α$_4$ in FIG. 7 and at α$_5$ and α$_6$ in FIG. 8. On the other hand, the secondary differentials have negative values at the inside of edge parts, as shown at β$_3$ and β$_4$ in FIG. 7 and at β$_5$ in FIG. 8.

In the region discriminator 1500, an edge part of a character is detected if at least one of the primary and secondary filters outputs a value larger than a threshold value. Then, the precision of edge detection can be maintained constant irrespective of a width of a character line. Further, the inside and outside of an edge part can be detected according to the secondary differential by using a secondary differential filter.

The primary differential filters 1503 and 1504 along the main scan direction and along the subscan direction receive data from the line memory 1502. The differentials obtained by them are sent to absolute value circuits 1505 and 1506 to obtain absolute values thereof. The absolute values are needed because the primary differential filters 1503 and 1504 have negative coefficients. Then, an average operator 1507 receives the absolute values and outputs an average $FL_{17-10}$ thereof. The average is used to take the two differentials along the two directions into account. The average $FL_{17-10}$ of the primary differentials is sent to comparators 1521, 1524 and 1528 for edge decision.

Figure 12:
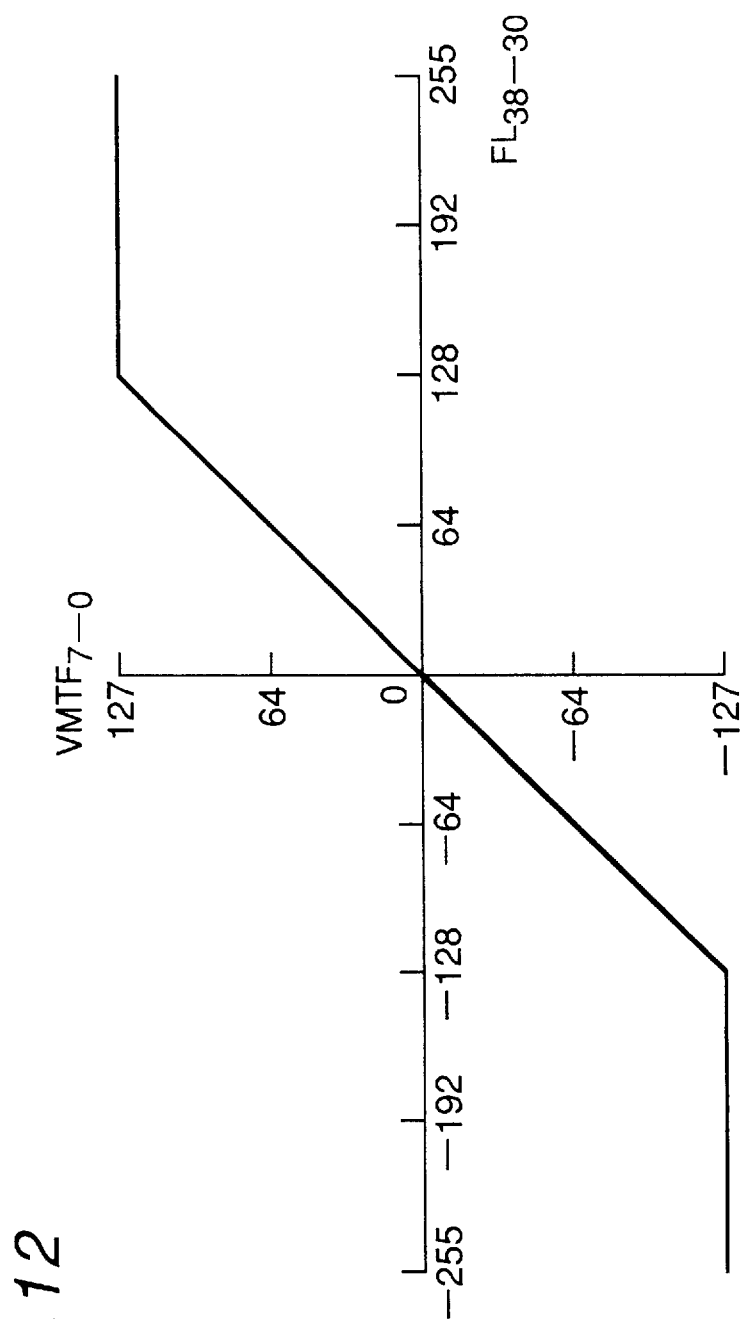
FIG. 12 is a graph of an MTF table.

The secondary differential filter 1508 also receives data from the line memory 1502, and an obtained second differential $D_{8-0}$ is output to an absolute value circuit 1509 to output an absolute value $FL_{27-20}$ thereof. The absolute value is needed because the secondary differential filter 1408 also have negative coefficients. The absolute value $FL_{27-20}$ of the secondary differential is sent to comparators 1522, 1523 and 1527 for edge decision. The secondary differential $D_{8-0}$ is also sent to a VMTF table 1512 shown in FIG. 12. The VMTF table 1512 outputs lightness edge component $VMTF_{7-0}$ in correspondence to the secondary differential $D_{7-0}$.

The inside and outside regions of an edge part is decided by using the second differential $D_{8-0}$ output from the secondary differential filter 1508. The most significant bit $D_8$ of the second differential represents a bit data on sign. If it is "L" level, the sign is plus, while if it is "H" level, the sign is minus. Therefore, if the most significant bit $D_8$ is "L" level, this means the inside of an edge detected, while if it is "H" level, this means that the outside of the edge. The most significant bit $D_8$ is output as edge discrimination signal $\overline{TOTO}$ to the MTF corrector 1600. Then, the MTF corrector 1600 can discriminate the inside or the outside of the edge according to the signal $\overline{TOTO}$.

The comparator 1521 for edge decision shown in FIG. 5B compares the first differential $FL_{17-10}$ with a first edge reference level $EDGref_{17-10}$, and it outputs a signal of "L" level if the first differential $FL_{17-10}$ is larger than the first edge reference level $EDGref_{l7-10}$. On the other hand, the comparator 1522 for edge decision compares the second differential $FL_{27-20}$ with a second edge reference level $EDGref_{27-20}$, and it outputs a signal of "L" level if the second differential $FL_{27-20}$ is larger than the second edge reference level $EDGref_{27-20}$. An AND gate 1533 receives the results of the comparison by the comparators 1521, 1522, and it outputs an $\overline{EG}$ signal if a signal of "L" level is received from at least one of the comparators 1521 and 1522. The $\overline{EG}$ signal means an edge.

Figures 11, 13:
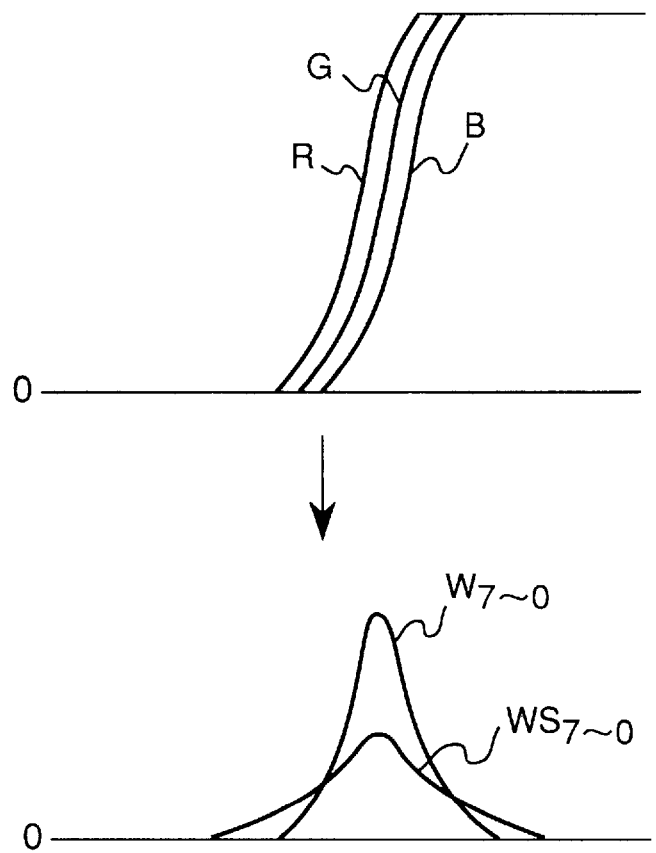
FIG. 11 is a diagram of a secondary differential filter.
FIG. 13 is a diagram for illustrating an increase in chroma data W due to phase differences among R, G and B data, and WS obtained by smoothing.

Next, decision of black pixel is explained in detail. A black pixel is detected based on chroma $W_{7-0}$, or if the chroma $W_{7-0}$ is smaller than a reference value, the pixel is decided as a black pixel. However, the value of chroma $W_{7-0}$ may become high even for a black pixel. For example, when the image sensor 14 vibrates when the image is read, the phases of data of red, green and blue may shift slightly relative to each other, as shown at a graph at an upper part in FIG. 13. In this case, the chroma $W_{7-0}$ becomes large as shown in another graph at a lower part in FIG. 13. If the pixel is decided whether the chroma $W_{7-0}$ is smaller than a reference value or not, the pixel is erroneously decided as a color pixel.

Then, in this embodiment, erroneous decision can be prevented by smoothing the chroma data before the decision. That is, the chroma data $W_{7-0}$ is first received from the HVC converter 1100 by another line memory 1514 of three lines, and it is smoothed by a filter 1515 of 3*3 matrix shown in FIG. 14. Chroma data $WS_{7-0}$ after smoothing has a more gentle value, as shown in the lower part in FIG. 13. Then, the above-mentioned type of erroneous decision can be prevented.

A comparator 1529 receives the chroma data $WS_{7-0}$ and compares it with a chroma reference value $WREF_{7-0}$. If the chroma data $WS_{7-0}$ is smaller than the chroma reference value $WREF_{7-0}$, the pixel is decided to be a black pixel, and the comparator 1529 sends $\overline{BK}$ signal to an AND gate 1537.

Figures 14, 15:
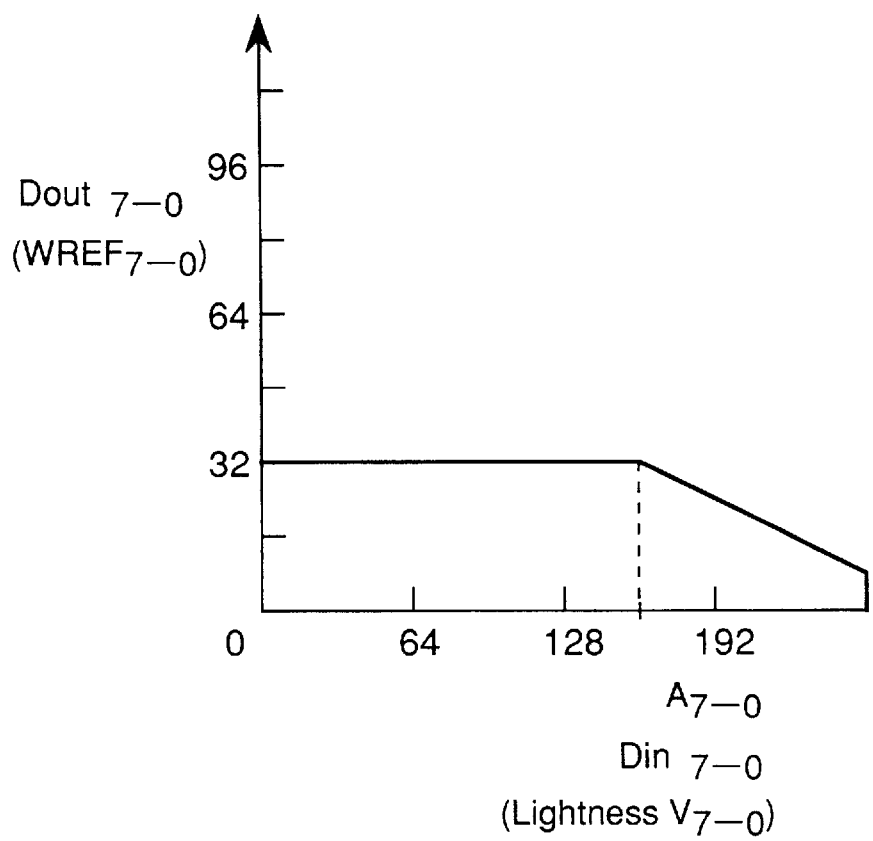
FIG. 14 is a diagram of a smoothing filter.
FIG. 15 is a graph of a WREF table.

The chroma reference signal $WREF_{7-0}$ is determined by a WREF table 1513 according to the lightness data $V_{7-0}$. As shown in FIG. 15, the WREF table 1513 has a feature that if the lightness data $V_{7-0}$ is larger than a predetermined value, $WREF_{7-0}$ is decreased linearly with the lightness $V_{7-0}$. This takes into account that black pixels determined erroneously will become apparent in a region where the lightness is high. The AND gate 1537 outputs signal $\overline{BKEG}$ which means an edge of a black pixel when the pixel is located at an edge ($\overline{EG}$="L"), it is a black pixel ($\overline{BK}$="L") and $\overline{BKEGEN}$ is "L" level.

Figure 16A:
FIG. 16A is a diagram an image consisting of cyan and yellow.
Figure 16B:
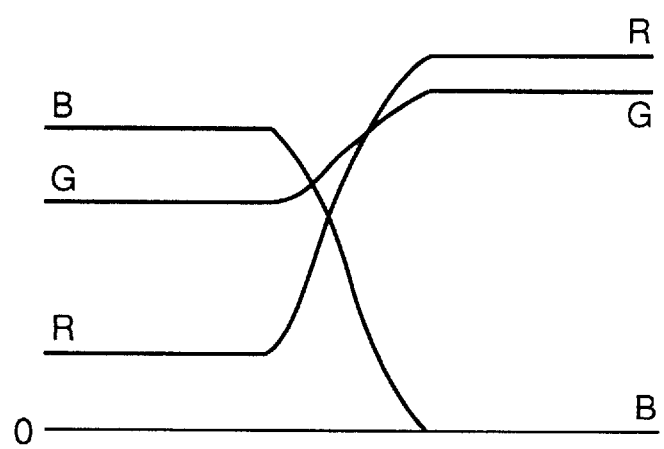
FIG. 16B is a graph of image data of red, green and blue of the image shown in FIG. 16A.
Figure 16C:
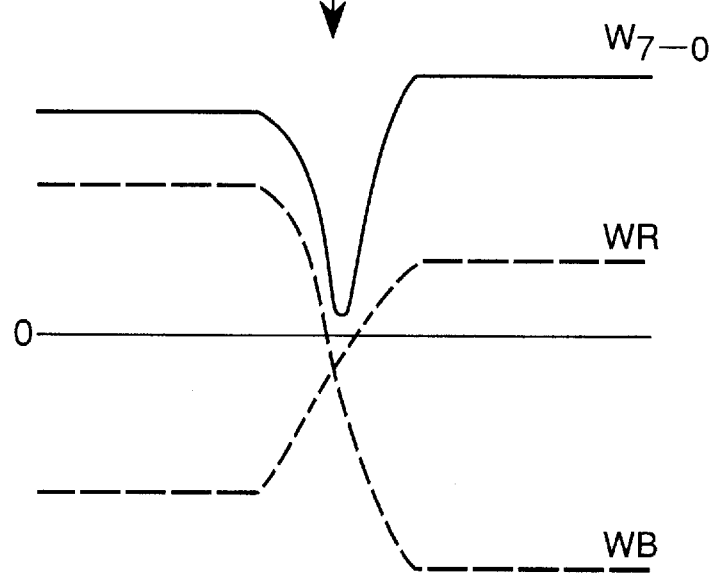
FIG. 16C is a graph of chroma W and color difference WR, WB for explaining erroneous detection of black at a boundary between cyan and yellow.

Next, the detection of a region which is liable to be detected as black character is explained in detail. If only the detection of a character (edges) and the detection of black pixel mentioned above are performed, a character having a low lightness (value) $V_{7-0}$ and a low chroma $W_{7-0}$ such as dark blue and deep green is liable to be decided erroneously as an edge of a black character. Further, if a color and its complementary color, such as cyan and yellow, as shown in FIG. 16A, are adjacent to each other, and if image data of red, green and blue are read as shown in FIG. 16B, the chroma $W_{7-0}$ may become low at the boundary between the cyan and yellow areas, as shown in FIG. 16C. That is, the color changes to black at the boundary. Such a point is also liable to be decided erroneously as an edge of a black character. If it is decided erroneously as an edge, a black line is printed at the transition region between cyan and yellow. For example, such an erroneous decision may happen when a blue character is printed on a background of yellow.

In order to solve the problem, a uniform color part is detected. Then, even if the pixel is decided to be a black pixel, the decision is canceled if it is located in a uniform color part. Thus, a black character can be decided more precisely.

A uniform color part has features that it is not an edge part, that it is a pixel in a color mode area and that a number of pixel having low lightness exceeds a certain threshold within a prescribed area. The uniform color part is detected as follows: The comparators 1523 and 1524 decide that the outputs $FL_{17-10}$ and $FL_{27-20}$ of the primary and secondary differential filters are lower than third and fourth edge reference levels $EDGref_{37-30}$ and $EDGref_{47-40}$, respectively, an AND gate 1534 outputs signal $\overline{BETA1}$ which means that a pixel does not exist at an edge. Further, if a comparator 1530 decides that the chroma data $WS_{7-0}$ is smaller than a reference value $Wref_{27-20}$, it outputs a signal $\overline{COL}$ which means a color data. Further, if a comparator 1531 decides that the lightness data $V_{17-10}$ is smaller than a reference value $Vref_{17-10}$, it outputs a signal $\overline{VL}$. Then, the AND gate 1538 receives the signals $\overline{BETA1}$, $\overline{COL}$ and $\overline{VL}$ and outputs a signal $\overline{CAN}$ which means that the pixel is not at an edge, that the pixel is in a color area and that the pixel has a low lightness. Then, the pixel is taken to be in a uniform part having a chromatic color and not located in a background. A counter 1542 counts the number of the signals $\overline{CAN}$ ("L") in the unit of 9*9 pixels. If the number $Cnt_{15-10}$ of the signals $\overline{CAN}$ is smaller than a reference value $Cntref_{7-0}$, a comparator 1543 outputs a signal $\overline{BKEGON}$.

An AND gate 1544 outputs the above-mentioned signal $\overline{BKEG}$ delayed by a delay circuit 1541 and the above-mentioned signal $\overline{BKEGON}$ as signal $\overline{PAPA}$. The signal $\overline{BKEG}$ is delayed by a delay circuit 1541 to process signals on the same pixel at the AND gate 1544. Even when the signal $\overline{BKEG}$ on the decision of a black edge is received, if the signal $\overline{BKEGON}$ is not received or if the pixel is located in a uniform color part, the decision of black edge is canceled, and the AND gate 1544 does not output a signal $\overline{PAPA}$. In other words, edge emphasis is performed only for a black character in a monochromatic background. On the other hand, if the number of pixels of a uniform color part is less than the prescribed reference value, the decision of black edge is kept to be valid, and the signal $\overline{PAPA}$ is output.

Figures 17, 18:
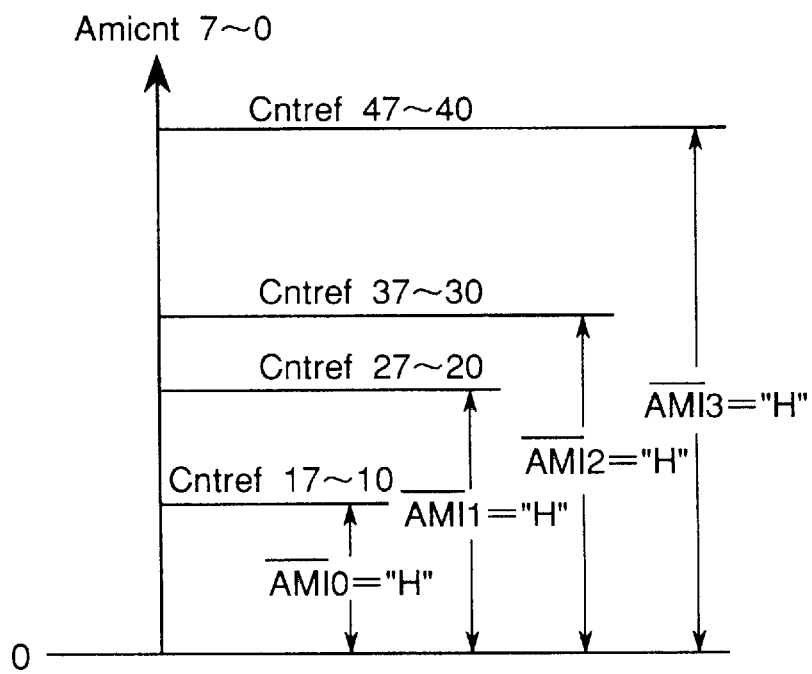
FIG. 17 is a diagram for showing two adjacent pixels along eight directions with respect to a pixel (X) under interest in filters for detecting white and black dot.
FIG. 18 is a diagram of four steps of reference levels for detecting dots and signals $\overline{\text{AMI0}}$–$\overline{\text{AMI3}}$.

Next, decision of dot area is explained in detail. Dot area means an area of an image composed of dots. As shown in FIG. 5A, filters 1510 and 1511 for detection white dots and black dots receive data output from the line memory 1502. Each filter decides if a pixel under interest is larger (white dots) or smaller (black dots) than a level $Amiref_{7-0}$ along all the directions with respect to an average of two pixels surrounding the pixel under interest along eight directions as shown in FIG. 17. Further, if the pixel under interest is larger than the eight averaged adjacent pixels, it is decided to be a white dot ($\overline{WAMI}$="L"), while if the pixel under interest is smaller than the eight averaged adjacent pixels, it is decided to be a black dot ($\overline{KAMI}$="L").

In concrete, the filter 1510 for detecting white dots outputs a signal $\overline{WAMI}$ of "L" level when each condition of Eq. (2) is satisfied and each condition of Eq. (3) is satisfied. Further, the filter 1511 for detecting black dots outputs a signal $\overline{KAMI}$ of "L" level when each condition of Eq. (2) is satisfied and each condition of Eq. (3) is satisfied. Eqs. (2) and (3) are described below.

$$X-(a_{11}+a_{22})/2>Amiref_{7-0},$$
$$X-(a_{31}+a_{32})/2>Amiref_{7-0},$$
$$X-(a_{51}+a_{42})/2>Amiref_{7-0},$$
$$X-(a_{53}+a_{43})/2>Amiref_{7-0},$$
$$X-(a_{55}+a_{44})/2>Amiref_{7-0}, \quad (2)$$
$$X-(a_{35}+a_{34})/2>Amiref_{7-0},$$
$$X-(a_{15}+a_{24})/2>Amiref_{7-0},$$

and $$X-(a_{13}+a_{23})/2>Amiref_{7-0}.$$
$$X>a_{22},$$
$$X>a_{32},$$
$$X>a_{42},$$
$$X>a_{43}, \quad (3)$$
$$X>a_{44},$$
$$X>a_{34},$$
$$X>a_{24},$$

and $$X>a_{23}.$$

Further, the filter 1511 for detecting black dots also outputs a signal $\overline{KAMI}$ of "L" level when each condition of Eq. (3) is satisfied and each condition of Eq. (4) is satisfied. Eqs. (3) and (4) are described below.

$$X-(a_{11}+a_{22})/2>Amiref_{7-0},$$
$$X-(a_{31}+a_{32})/2>Amiref_{7-0},$$
$$X-(a_{51}+a_{42})/2>Amiref_{7-0},$$
$$X-(a_{53}+a_{43})/2>Amiref_{7-0},$$
$$X-(a_{55}+a_{44})/2>Amiref_{7-0}, \quad (4)$$
$$X-(a_{35}+a_{34})/2>Amiref_{7-0},$$
$$X-(a_{15}+a_{24})/2>Amiref_{7-0},$$

and $$X-(a_{13}+a_{23})/2>Amiref_{7-0}.$$
$$X>a_{22},$$
$$X>a_{32},$$
$$X>a_{42},$$
$$X>a_{43}, \quad (5)$$
$$X>a_{44},$$
$$X>a_{34},$$
$$X>a_{24},$$

and $$X>a_{23}.$$

Counters 1550 and 1551 receive signals $\overline{WAMI}$ and $\overline{KAMI}$ output by the filters 1510 and 1511, and they count a number of signals of "L" level in a 41*9 pixel matrix. The counts thereof are sent to a maximum detector 1552 which outputs a maximum thereof $Amicnt_{7-0}$ to four comparators 1553–1556. Each comparator 1553–1556 compares it with a reference level $Cntref_{17-10}$, $Cntref_{27-20}$, $Cntref_{37-30}$ and $Cntref_{47-40}$ of four steps to quantize it, and they output $\overline{AMI0}$, $\overline{AMI1}$, $\overline{AMI2}$ and $\overline{AMI3}$ if it is larger than the reference signal (refer to FIG. 18).

The region discriminator 1500 further decides some points explained below. A comparator 1532 is provided to decide a highlight area. It compares the lightness data $V_{7-0}$ with a second reference level $Vref_{27-20}$, and if the lightness data $V_{7-0}$ is larger than the second reference level $Vref_{27-20}$, it outputs a signal $\overline{VH1}$ which means that the pixel exists in a highlight area. The comparators 1527 and 1528 are provided to decide an area not located at an edge. They compare the first differential $FL_{17-10}$ and the second differential $FL_{27-20}$ with seventh and eighth reference levels $EDGref_{77-70}$ and $EDGref_{87-80}$. If the first differential $FL_{17-10}$ and the second differential $FL_{27-20}$ are smaller than seventh and eighth reference levels $EDGref_{77-70}$ and $EDGref_{87-80}$, a signal $\overline{BETA2}$ which means a pixel not located at an edge is sent to an AND gate 1539. The AND gate 1539 also receives the above-mentioned $\overline{VH1}$ signal from the comparator 1532, and it outputs a signal $\overline{HLIGHT}$ which means a highlight area, through a delay circuit 1546.

Figure 19A:
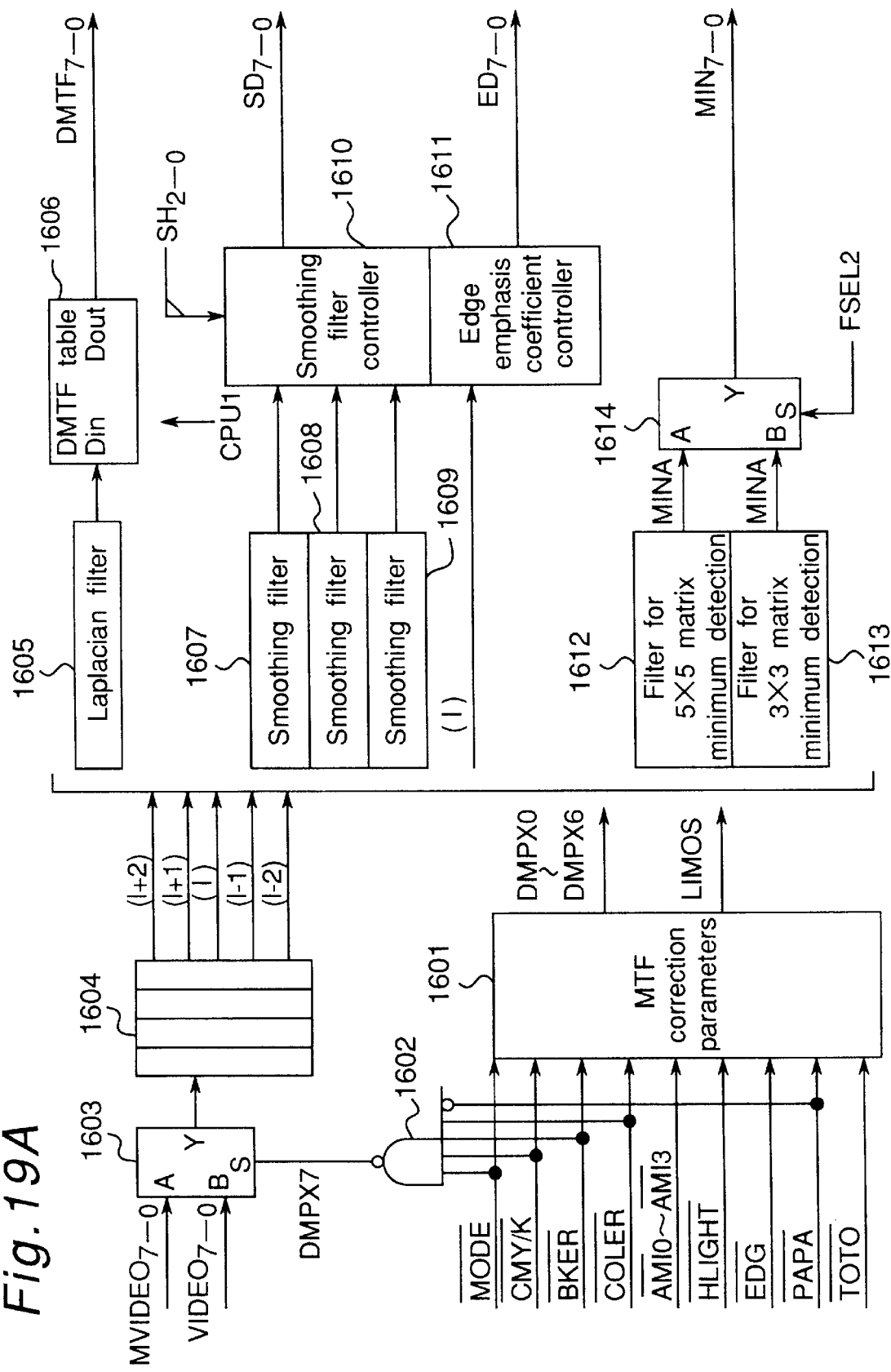
FIGS. 19A and 19B are block diagrams of an MTF correction section.
Figure 19B:
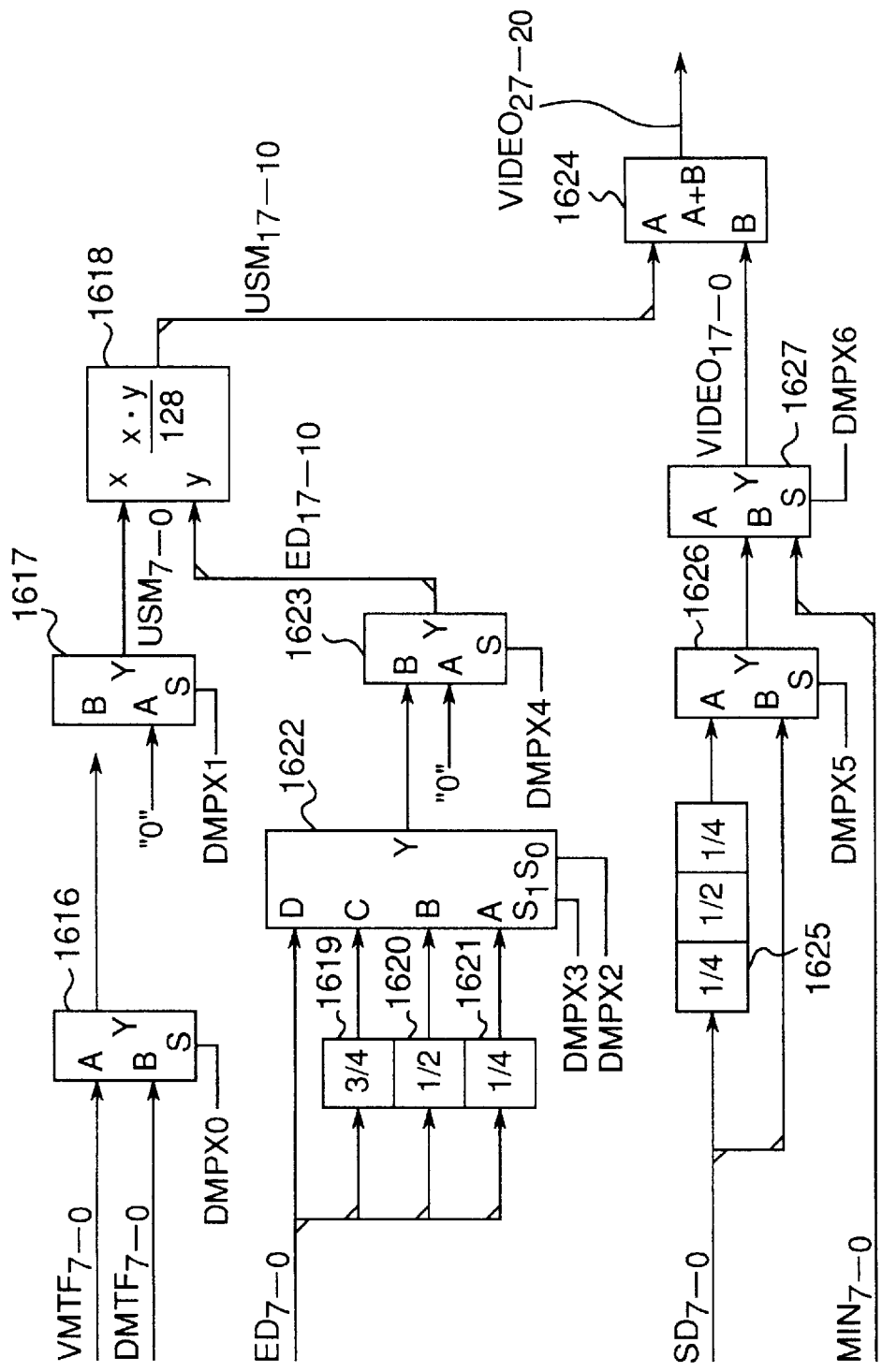

FIGS. 19A and 19B show the MTF corrector 1600 which performs edge emphasis and smoothing most suitable for the image data $VIDEO_{7-0}$ and $MVIDEO_{7-0}$ received from the color corrector 1400 according to the kind of pixels recognized with the signals ($\overline{AMI0}$–$\overline{AMI3}$, $\overline{PAPA}$, $\overline{EDG}$, $\overline{HLIGHT}$ and $\overline{TOTO}$) and printing situation recognized by status signals ($\overline{MODE}$, $\overline{CMY/K}$, $\overline{BKER}$, $\overline{COLER}$). Further, a duty ratio of laser emission is changed according to the kind of image recognized by the region discriminator 1500. Still further, a prescribed value is added to pixel data at edges to correct amounts of excess or deficient toners.

The MTF corrector 1600 recognizes the color of toners based on $\overline{CMY/K}$ signal. If the $\overline{CMY/K}$ signal is "L" level, printing is performed with toners of cyan, magenta or yellow. Further, one of following areas is recognized by using three signals $\overline{MODE}$, $\overline{BKER}$ and $\overline{COLER}$: Full color standard area ($\overline{BKER}$="H", $\overline{COLER}$="H" and $\overline{MODE}$="H"), full color photographic area ($\overline{BKER}$="H", $\overline{COLER}$="H" and $\overline{MODE}$="L"), monochromatic color standard area ($\overline{BKER}$="H", $\overline{COLER}$="L" and $\overline{MODE}$="H"), monochromatic color photograph area ($\overline{BKER}$="H", $\overline{COLER}$="L" and $\overline{MODE}$="L"), monochromatic standard area ($\overline{BKER}$="L", $\overline{COLER}$="L" and $\overline{MODE}$="H"), and monochromatic photographic area ($\overline{BKER}$="L", $\overline{COLER}$="L" and $\overline{MODE}$="L"). Further, it recognizes the kind of a pixel to be printed by using the result of region discrimination as follows: A highlight part of uniform density ($\overline{HLIGHT}$="L"), a non-edge part ($\overline{HLIGHT}$="H", $\overline{EDG}$="H", $\overline{PAPA}$="H"), a color edge part ($\overline{HLIGHT}$="H", $\overline{EDG}$="L", $\overline{PAPA}$="H"), and a black edge part ($\overline{HLIGHT}$="H", $\overline{EDG}$="L", $\overline{PAPA}$="L"). Further, a region around a black edge is discriminated to be an outside region of the edge part ($\overline{TOTO}$="L") or an inside region of the edge part ($\overline{TOTO}$="H").

Before explaining the MTF corrector 1600 further, MTF correction in each mode mentioned above is explained. First, MTF correction in the full color standard mode ($\overline{MODE}$="H", $\overline{BKER}$="H" and $\overline{COLER}$="H") is explained. Table 1 compiles signal levels of various signals received by a controller 1601, and printing situations represented by the levels and signals of DMPX0, DMPX1, DMPX5 and DMPX6.

$VMTF_{7-0}$ of lightness is used instead of an edge component $DMTF_{7-0}$ of density because the former is more sensitive than the latter on an edge due to background. If the pixel composes a dot image, the edge emphasis component (or $VMTF_{7-0}$) is limited according to the degree or density of dots. Thus, a Moire pattern is prevented to occur.

On the other hand, edge emphasis is not performed for pixels at an outside region of an edge part, and a minimum $MIN_{7-0}$ in the 5*5 or 3*3 pixel matrix is output as $VIDEO_{27-20}$. By using the minimum in prescribed matrices as image data of black pixel, it can be prevented that an outside region of a black character (or contour of a character) becomes thick or irregular.

When cyan, magenta or yellow toners are used for printing ($\overline{CMY/K}$="L"), edge emphasis is not performed for a pixel at an inside region and at an outside region of a black edge part, and a minimum data $MIN_{7-0}$ obtained in a 5*5 or 3*3 matrix is output as signal $VIDEO_{27-20}$. By using the minimum data $MIN_{7-0}$ as image data of cyan, magenta or yellow, a very narrow extended line of cyan, magenta or yellow at an edge part, as shown in FIG. 20A in an area represented with a dashed circle, can be removed as shown in FIG. 20B. Similar processing is performed for a pixel at an outside region of a black edge part.

Figure 21A:
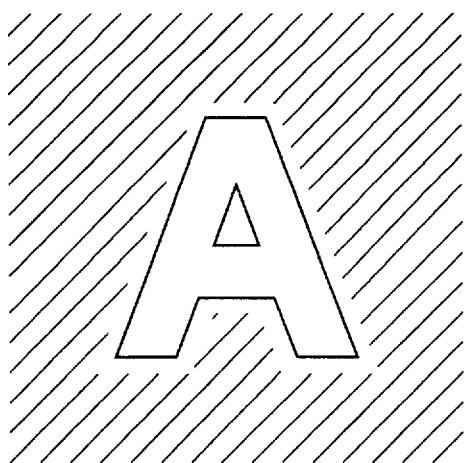
FIGS. 21A and 21B are diagrams of examples of images in correspondence to FIGS. 20A and 20B.
Figure 21B:
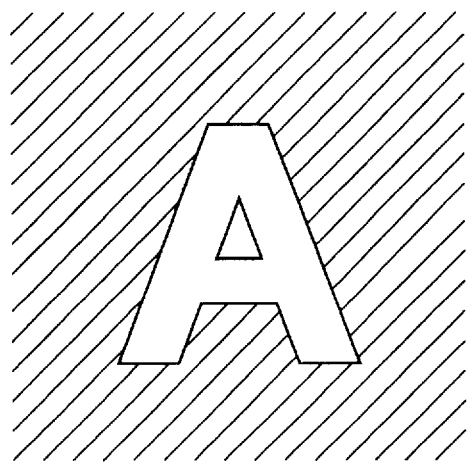

The minimum data $MIN_{7-0}$ is used to remove a vary narrow line of cyan, magenta or yellow according to a reason explained below. If a result of edge detection (say $FL_{17-10}$ or $FL_{27-20}$ in this embodiment) is subtracted from the image data of C, M or Y in order to remove a very narrow extended line. even the data of cyan, magenta or yellow around an edge part of a black character becomes zero. Thus, as shown in FIG. 21A, a white peripheral region appears around an edge of a black character. On the other hand, when the minimum data $MIN_{7-0}$ is used as image data of cyan, this means that image data of cyan, magenta or yellow is decreased at the inside region and at the outside region of an edge part of a black character, or image data of black is decreased at the outside region of the edge, as shown in FIG. 20B. Thus, as shown in FIG. 21B, a black character is printed which has emphasized edges and has no peripheral white portion around the edge part. Further, because image

TABLE 1

Singals in full color standard mode

| CMY/K | HLIGHT | EDG | PAPA | Contents | DMPX1 | DMPX0 | USM | DMPX6 | DMPX5 | VIDEO |
|---|---|---|---|---|---|---|---|---|---|---|
| L (CMY mode) | L | — | — | highlight, uniform | L | H | 0 | H | L | FSD |
| | H | H | H | non-edge | L | H | 0 | H | H | SD |
| | H | L | H | color edge | H | H | DMTF | H | H | SD |
| | H | L | L | black edge (inside, outside) | L | L | 0 | L | H | MIN |
| H (BK mode) | L | — | — | highlight, uniform | L | H | 0 | H | L | FSD |
| | H | H | H | non-edge | L | H | 0 | H | H | SD |
| | H | L | H | color edge | L | H | 0 | H | H | SD |
| | H | L | L | black edge (outside) | L | L | 0 | L | H | MIN |
| | H | L | L | black edge (inside) | H | L | VMTF | H | H | SD |

As to MTF correction of a pixel in a black edge area ($\overline{HLIGHT}$="H", $\overline{EDG}$="L", $\overline{PAPA}$="L"), when black toners are used for printing ($\overline{CMY/K}$="H") for pixels at an inside region of an edge part, $VIDEO_{27-20}$ is obtained by adding edge component $VMTF_{7-0}$ of lightness to ordinary image data $SD_{7-0}$ for edge emphasis. The edge component data of black is decreased at the outside region of the edge part, the character does not becomes wider or irregular by edge emphasis.

As explained above, the region discriminator 1500 discriminates a edge part of black characters and color characters. For a pixel in a color edge area ($\overline{HLIGHT}$="H", $\overline{\text{EDG}}$="L", $\overline{\text{PAPA}}$="H"), edge emphases is not performed when black toners are used in printing ($\overline{\text{PAPA}}$="H"), and ordinary pixel data $SD_{7-0}$ is output as $VIDEO_{27-20}$. In other words, edge emphasis is not performed for an edge of a color character in printing with black toners so that black margin of a color character can be prevented. On the other hand, when cyan, magenta or yellow toners are used in printing, density edge component $DTMF_{7-0}$ is added to the ordinary pixel data $SD_{7-0}$ to be output as $VIDEO_{27-20}$.

For a pixel at a uniform part in a highlight area ($\overline{\text{HLIGHT}}$="L"), edge emphasis is not performed, and $FSD_{7-0}$ subjected to smoothing is output as image data $VIDEO_{27-20}$. Then, noises in the highlight area become unnoticeable.

For a pixel in a non-edge area ($\overline{\text{HLIGHT}}$="H", $\overline{\text{EDG}}$="H", $\overline{\text{PAPA}}$="H"), edge emphasis is not performed, and ordinary image data $SD_{7-0}$ is output as image data $VIDEO_{27-20}$.

Next, MTF (mutual transfer) correction performed by the MTF corrector 1600 is explained with reference to FIGS. 19A and 20B. A controller 1601 for MTF correction parameters receives control signals $\overline{\text{AMI0}}$–$\overline{\text{AMI3}}$, $\overline{\text{HLIGHT}}$, $\overline{\text{EDG}}$, $\overline{\text{PAPA}}$ and $\overline{\text{TOTO}}$ from the region discriminator 1500. Further, the controller 1601 receives control signals $\overline{\text{MODE}}$, $\overline{\text{CMY/K}}$, $\overline{\text{BKER}}$ and $\overline{\text{COLER}}$ each of one bit. The signal MODE represents a kind of a document set by the operational panel. It is set to be "L" level in the photography mode and "H" level in the standard mode. The signal $\overline{\text{CMY/K}}$ is a status signal representing a printing situation, and it is set to be "L" level for printing with cyan, magenta or yellow toners and "H" level for printing with black toners. The signal $\overline{\text{BKER}}$ requires signal processing in the monochromatic mode. The signal $\overline{\text{COLER}}$ requires signal processing in the color mode. The signals $\overline{\text{BKER}}$ and $\overline{\text{COLER}}$ are signals which represent an area to be printed in the monochromatic mode and in the color mode. The controller 1601 supplies DMPX0–DMPX6 shown in Table 1 and a signal LIMOS shown in Table 2.

TABLE 2

| | Setting of duty ratio | | |
|---|---|---|---|
| $\overline{\text{PAPA}}$ | $\overline{\text{MODE}}$ | $\overline{\text{TOTO}}$ | LIMOS |
| L | H | H | L |
| L | H | L | H |
| H | — | — | H |
| H | L | — | H |

Figure 22:
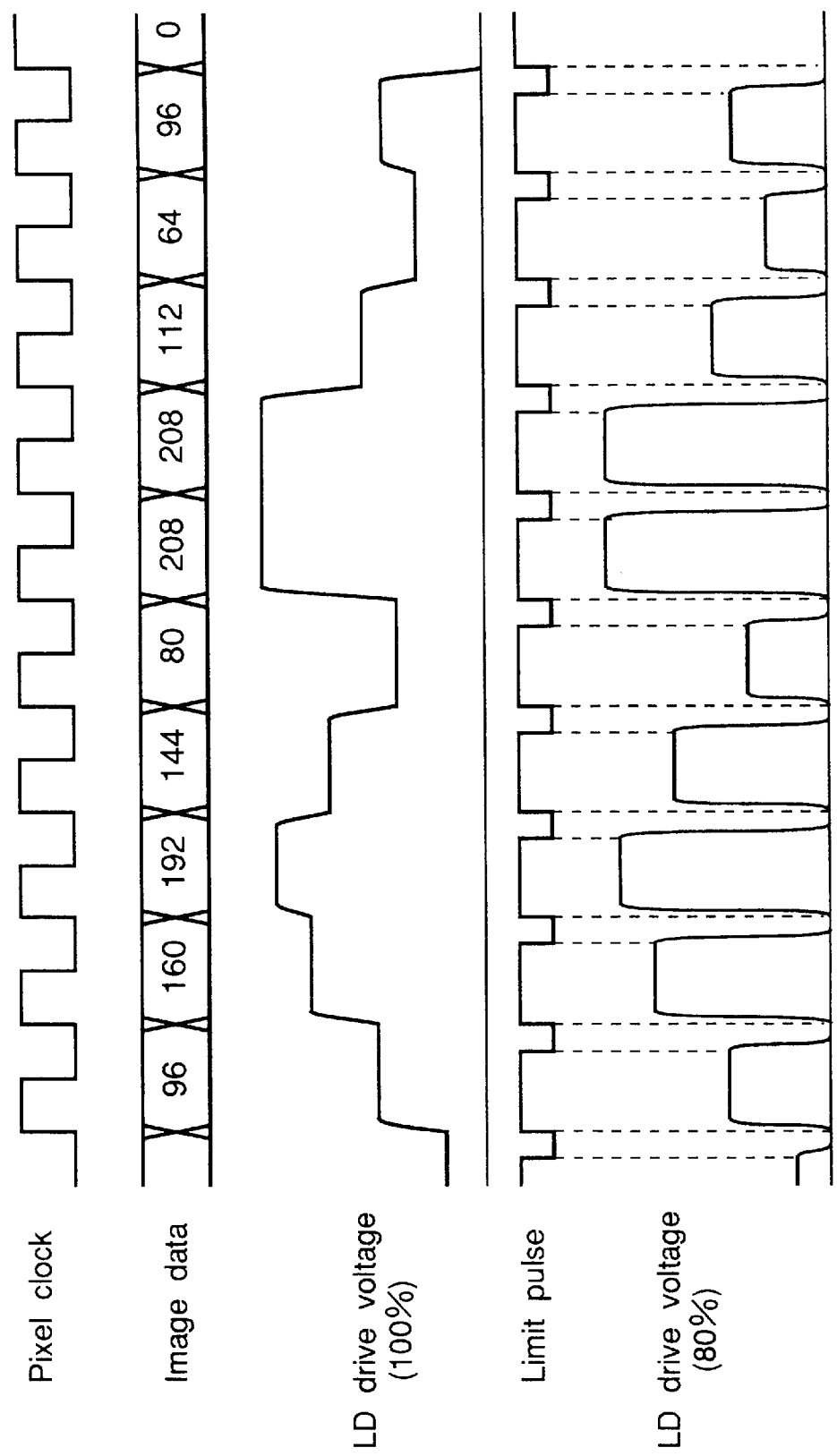
FIG. 22 is a timing chart of pixel clock, image data, driving voltage for laser diode, limit pulse, and driving voltage with a duty ratio.

The signal LIMOS changes a duty ratio of the laser diode that emits a beam according to the image data. In such a case, the duty ratio is defined as a ratio of the laser emission period in one pixel clock cycle. FIG. 22 shows a timing chart on driving the laser diode (LD) wherein two types of driving signals for the laser diode are shown for duty ratios of 100% and 80%. If the signal LIMOS is "L" level, the duty ratio is set to be 100% in order to prevent a Moire pattern. If the signal LIMOS is "H" level, the duty ratio is set to be 80% to reduce noises between lines along the main scan direction. If $\overline{\text{MODE}}$="H" or the pixel is at an edge part or in a dot in a dot image in the standard mode, the signal LIMOS is set to be "L" in order to improve the reproducibility at an edge part and in a dot image. On the other hand, in the photography mode and at a non-edge region in the standard mode, the signal LIMOS="H" to provide non-emitting periods in order to make noises between lines unnoticeable.

The signals $\overline{\text{MODE}}$, $\overline{\text{CMY/K}}$, $\overline{\text{BKER}}$ and $\overline{\text{COLER}}$ and an inverted signal of the signal $\overline{\text{PAPA}}$ are also sent to a NAND gate 1602. Then, the NAND gate 1602 outputs a signal DMPX7 to a selection terminal of a selector 1603. The NAND gate 1602 outputs "L" only when the signals $\overline{\text{MODE}}$, $\overline{\text{CMY/K}}$, $\overline{\text{COLER}}$ and $\overline{\text{BKER}}$ are "H" and the signal $\overline{\text{PAPA}}$ is "L". That is, the NAND gate 1602 outputs "L" only when black is printed at a black edge part in the full color standard copy mode. The selector 1603 selects the lightness data $MVIDEO_{7-0}$ subjected to the masking processing or the density data $VIDEO_{7-0}$ according as the signal DMPX7 is "L" level or not.

The selector 1603 receives image data $MVIDEO_{7-0}$ subjected to masking processing at A input and image data $VIDEO_{7-0}$ converted to density at B input in the order of cyan, magenta, yellow and black. The data selected by the selector 1603 is supplied, through a line memory 1604 supplying data of 5*5 matrix of five lines ("1–2" to "1+2") to a Laplacian filter 1605, smoothing filters 1607, 1608 and 1609, a filter 1612 for detecting a minimum in a 5*5 matrix, and a filter 1613 for detecting a minimum in a 3*3 matrix.

Figure 23:
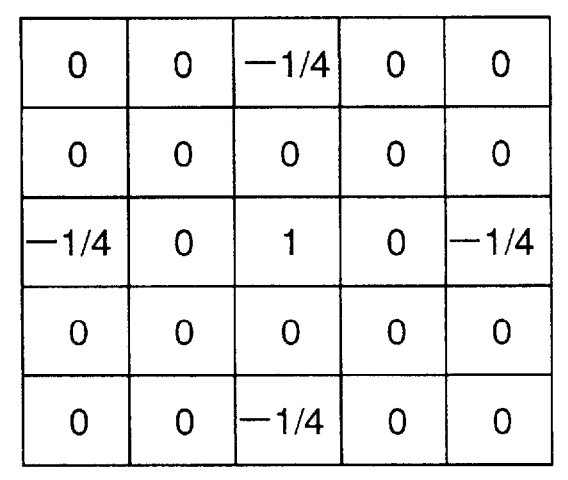
Figure 24:
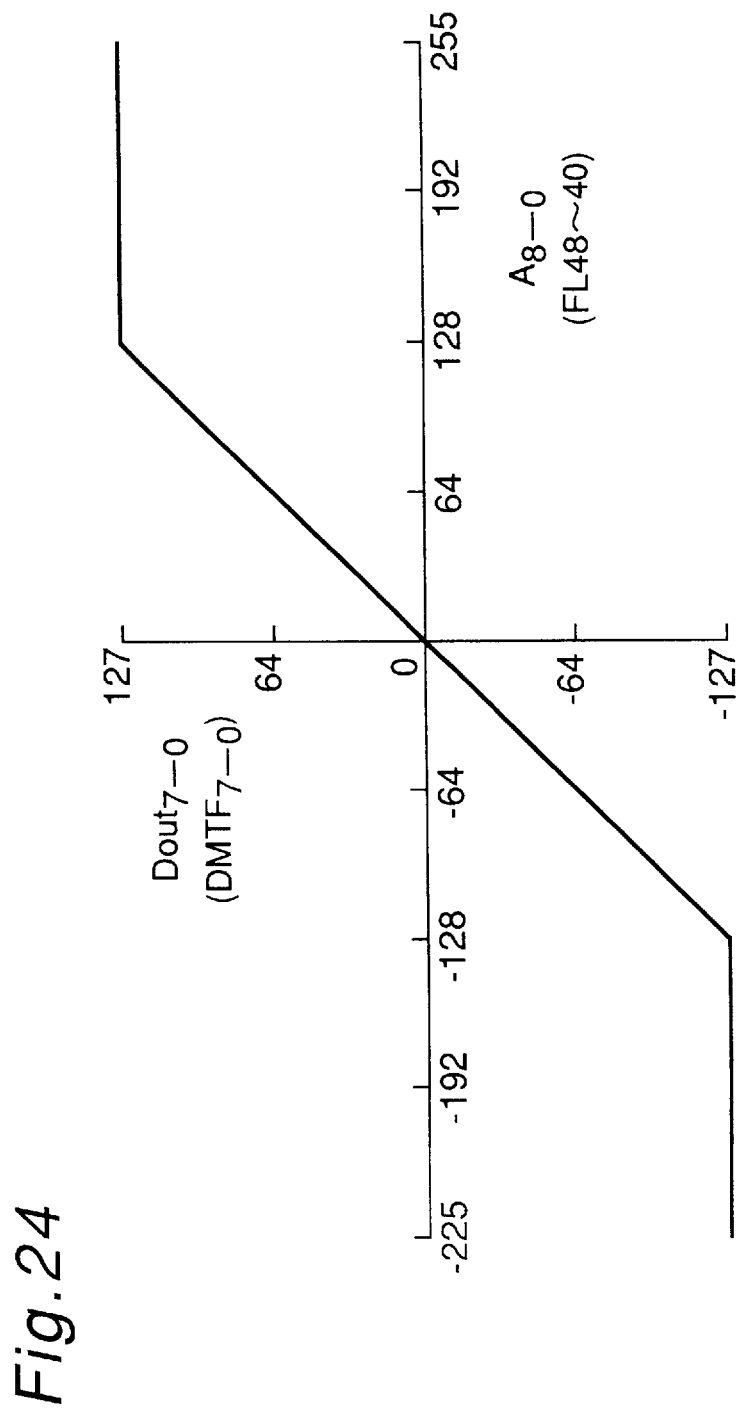
FIG. 24 is a graph of DMTF table.

The Laplacian filter 1605, shown in FIG. 23, converts a data on a pixel under interest at the center to an enhanced data, and sends it to a DMTF table 1606. The DMTF table 1606 performs conversion shown in FIG. 24 and sends a conversion data as density edge emphasis component data $DMTF_7$.

The smoothing filters 1607, 1608 and 1609 makes the input data smooth to 300, 200 and 100 dpi, and FIGS. 25–26 show examples of the three filters. The data subjected to smoothing as well as the data without subjected to smoothing is sent to a controller 1610 for smoothing filters. The controller 1610 selects one of the input data according to a sharpness change signal $SH_{2-0}$ and sends it as $SD_{7-0}$. The sharpness change signal $SH_{2-0}$ is also received by another controller 1611 of edge emphasis coefficient to select one of eight kinds of the edge emphasis coefficients as $ED_{7-0}$ per each pixel (in real time), and change a plurality of sharpness up to eight areas simultaneously. The sharpness change signal $SH_{2-0}$ of eight steps on the degree of sharpness is set by a user with the operational panel.

The filters 1612 and 1613 shown in FIGS. 27 and 29 detect minima in a 5*5 matrix and in a 3*3 matrix with a pixel under interest placed at the center of the matrices. The 5*5 filter 1612 shown in FIG. 28 sends a minimum (MIN ($a_{11}, a_{12}, \ldots, a_{54}$ and $a_{55}$) as $MINA_{7-0}$ when the pixel under interest is put at the center, while the 3*3 filter 1613 shown in FIG. 29 sends a minimum (MIN($a_{11}, a_{12}, \ldots, a_{32}$ and $a_{33}$) as $MINB_{7-0}$ when the pixel under interest is put at the center. The minimum data $MINA_{7-0}$ and $MINB_{7-0}$ are sent to the selector 1614. The selector 1614 selects one of them according to a selection signal FSEL2, and sends it as $MIN_{7-0}$. The selection signal FSEL2 has been determined experimentally. By using the minimum data $MIN_{7-0}$ in the matrix as the data for the pixel under interest, a narrow character portion may be deleted. The reason for using the minimum data $MIN_{7-0}$ is already explained above with reference to FIG. 20B.

MTF correction is explained further. As explained above, the selectors 1616 and 1617 select appropriate data among data $VMTF_{7-0}$, $DMTF_{7-0}$ and "0" of edge emphasis amount according to the type of pixel or signals DMPX0 and DMPX1. Then, it outputs edge emphasis component $USM_{7-0}$. The signals DMPX0 and DMPX1 are output as shown in Table 1 according to the type of pixel under printing.

Further, the selectors 1622 and 1623 suppress edge emphasis coefficient $ED_{7-0}$ according to the results of decision of dots $\overline{\text{AMI0}}$–$\overline{\text{AMI3}}$ received from the region discriminator 1500. The edge emphasis coefficient $ED_{7-0}$ input to the input D of the selector 1622 controls the degree of edge emphasis (or sharpness) and it is set by a central processing unit which controls the MTF corrector. Further, inputs A, B and C of the selector 1622 receives $ED_{7-0}$ multiplied by ¾, ½ and ¼ by multipliers 1619, 1620 and 1621. The signals DMPX2 and DMPX3 are sent by the parameter controller 1601 to the selector 1622, while the signal DMPX4 is sent by the parameter controller 1601 to the selector 1623. The signals DMPX2–DMPX4 are output according to $\overline{AMI0}$–$\overline{AMI3}$ as shown in Table 3. If $\overline{AMI0}$–$\overline{AMI3}$ are all "H" or if the image is decided not a dot image by the region discriminator 1500, the edge emphasis coefficient $ED_{7-0}$ as received is output as $ED_{17-10}$ to a calculator 1618. As explained above, the region discriminator 1500 outputs one of $\overline{AMI0}$–$\overline{AMI3}$ of "L" level successively in the order of the degree of dots, and the selectors 1622 and 1623 select a data in the data received at inputs A, B, C, D and "0" according to the degree of dots.

TABLE 3

| Dot image processing | | | | | | | |
|---|---|---|---|---|---|---|---|
| $\overline{AMI3}$ | $\overline{AMI2}$ | $\overline{AMI1}$ | $\overline{AMI0}$ | DMPX4 | DMPX3 | DMPX2 | ED |
| L | L | L | L | L | — | — | 0 |
| H | L | L | L | H | L | L | ED/4 |
| H | H | L | L | H | H | H | ED/2 |
| H | H | H | L | H | L | L | 3ED/4 |
| H | H | H | H | H | H | H | ED |

The calculator multiplies the edge emphasis $USM_{7-0}$ with the edge emphasis coefficient $ED_{17-10}$ and outputs the product as edge emphasis $USM_{17-10}$.

The selectors 1626 and 1627 are controlled by signals DMPX5 and DMPX6 from the parameter controller 1601. They selects one of ordinary image data $SD_{7-0}$, data $FSD_{7-0}$ subjected to smoothing, and data $MIN_{7-0}$ received from the selector 1614 and outputs the selected data as $VIDEO_{17-10}$. The signals DMPX5 and DMPX6 are output according to the type of pixel as shown in Table 1. Next, an adder 1624 adds the signal $VIDEO_{17-10}$ with the edge emphasis $USM_{17-10}$ and outputs the sum as $VIDEO_{27-20}$.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processor comprising:
   an input device receiving image data of a document;
   a detector detecting an edge part in the image data received by said input means;
   a discriminator discriminating an inside area and an outside area of the edge part detected by said detector;
   an image data corrector processing the image data in the inside area and in the outside area discriminated by said discriminator differently from each other and performing edge emphasis in one of the inside area and the outside area.

2. The image processor according to claim 1, wherein said input means further comprises a converter which converts the image data to color data of yellow, magenta, cyan and black, and said detector detects an edge part consisting of pixels of black.

3. The image processor according to claim 1, wherein said image data corrector performs edge emphasis in the inside area discriminated by said discriminator.

4. The image processor according to claim 2, wherein said image data corrector performs edge emphasis for a pixel of black by adding a predetermined value to a data thereof.

5. The image processor according to claim 2, wherein said image data corrector decreases data for a pixel other than black in the inside and outside areas of the edge part discriminated by said discriminator to a minimum of the data of the pixel under interest and pixels surrounding the pixel.

6. An image processor comprising:
   an input means for receiving image data of a document consisting of chromatic components and achromatic components;
   a detector detecting an edge part of a black image based on value and chroma components of the image data received by said input means;
   a discriminator discriminating an inside area and an outside area of the edge part detected by said detector;
   an edge emphasis processor which emphasize an edge part detected by said detector; and
   a controller which controls said edge emphasis processor to perform edge emphasis on one of the inside and outside areas discriminated by said discriminator.

7. The image processor according to claim 6, further comprising a substitution operator which substitutes data of a pixel other than black in the inside and outside areas of the edge part discriminated by said discriminator to a minimum of the data of the pixel under interest and pixels surrounding the pixel.

8. The image processor according to claim 7, wherein said controller controls said edge emphasis processor to perform edge emphasis on the inside area discriminated by said discriminator.

9. The image processor according to claim 6, wherein said controller controls said edge emphasis processor to perform edge emphasis for a pixel of black in the inside area of the edge part by adding a predetermined value to a data thereof.

10. The image processor according to claim 6, wherein said controller controls said edge emphasis processor to decrease a data of a pixel other than black in the outside area of the edge part discriminated by said discriminator to a minimum of the data of the pixel under interest and pixels surrounding the pixel.

11. The image processor according to claim 10, wherein said controller controls said edge emphasis processor to perform edge emphasis on the inside area discriminated by said discriminator.

12. A color image forming apparatus for forming a document image on a sheet of paper, the apparatus comprising:
   an image reader having a photoelectric converter and scanning a document to obtain electric data with the photoelectric converter in the unit of pixel;
   a color converter converting the image data read with said image reader to color data of yellow, magenta, cyan and black;
   a second converter for converting the image data to value and chroma data;
   a detector detecting an edge part in an image of black based on the value and chroma data;
   a discriminator discriminating an inside area and an outside area of the edge part detected by said detector;
   an image data corrector performing edge emphasis in one of the inside and outside areas discriminated by said discriminator; and an image forming section for forming a color image on a sheet of paper based on the color data received from said image data corrector.

13. The apparatus according to claim 12, wherein said controller controls said edge emphasis processor to perform edge emphasis on the inside area discriminated by said discriminator.

14. The apparatus according to claim 13, further comprising a second image data corrector to decrease data of a pixel other than black in the outside area of the edge part discriminated by said discriminator to a minimum of the data of the pixel under interest and pixels surrounding the pixel.

15. A method for processing color image data comprising the steps of:

receiving image data of a document consisting of chromatic components and achromatic components;

detecting an edge part in a black image based on value and chroma components of the image data;

discriminating an inside area and an outside area of the edge part; and performing edge emphasis in one of the inside and outside areas.

16. The method according to claim 15, further comprising the step of substituting data of a pixel other than black in the inside and outside areas of the edge part to a minimum of the data of the pixel under interest and pixels surrounding the pixel.

17. The method according to claim 16, wherein in said emphasizing step, edge emphasis is performed on the inside area.

* * * * *